INVENTORS
JOSEPH S. PELLICONE
EDWIN N. DEJEWSKI
LAZZARO PEZZA

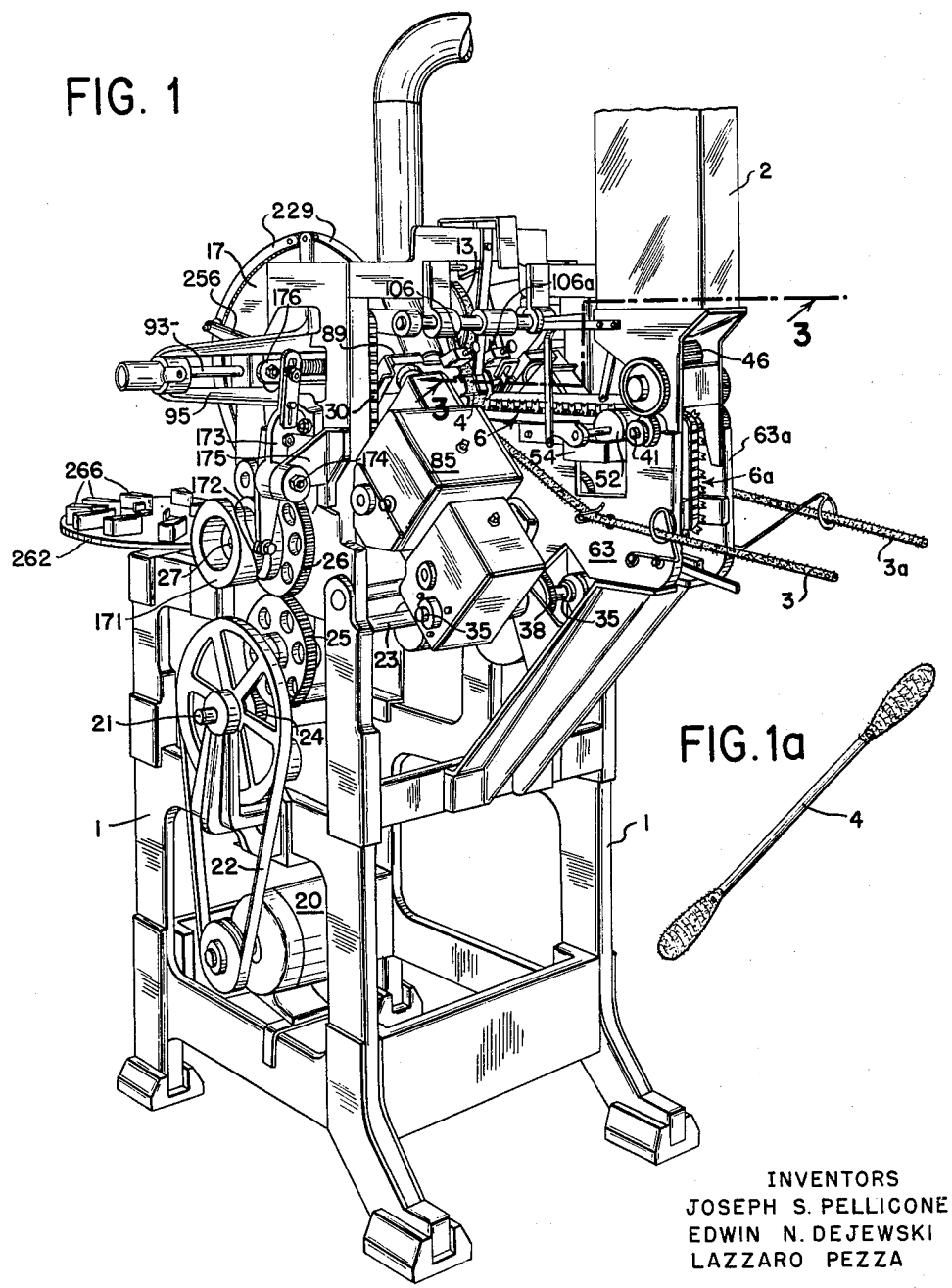

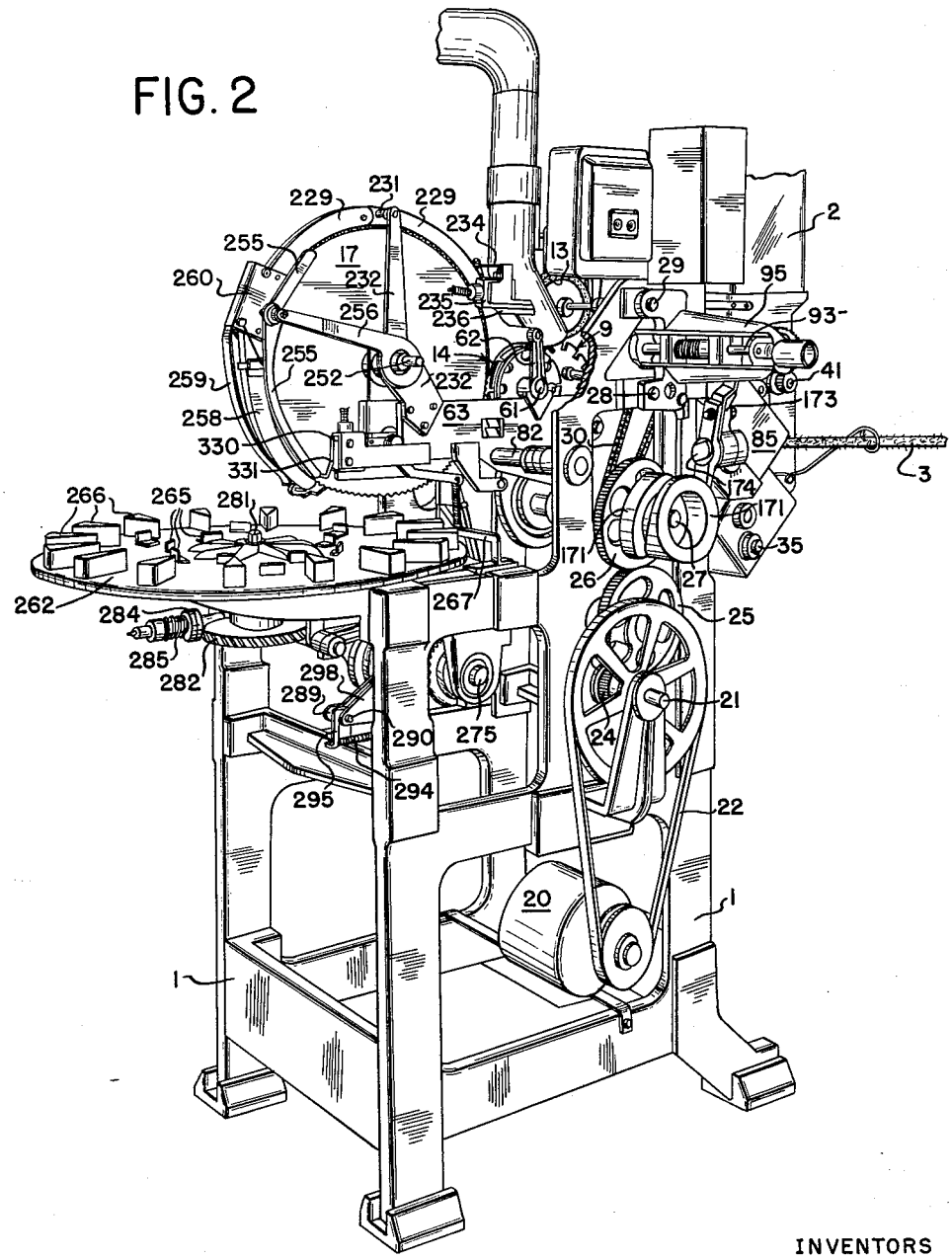

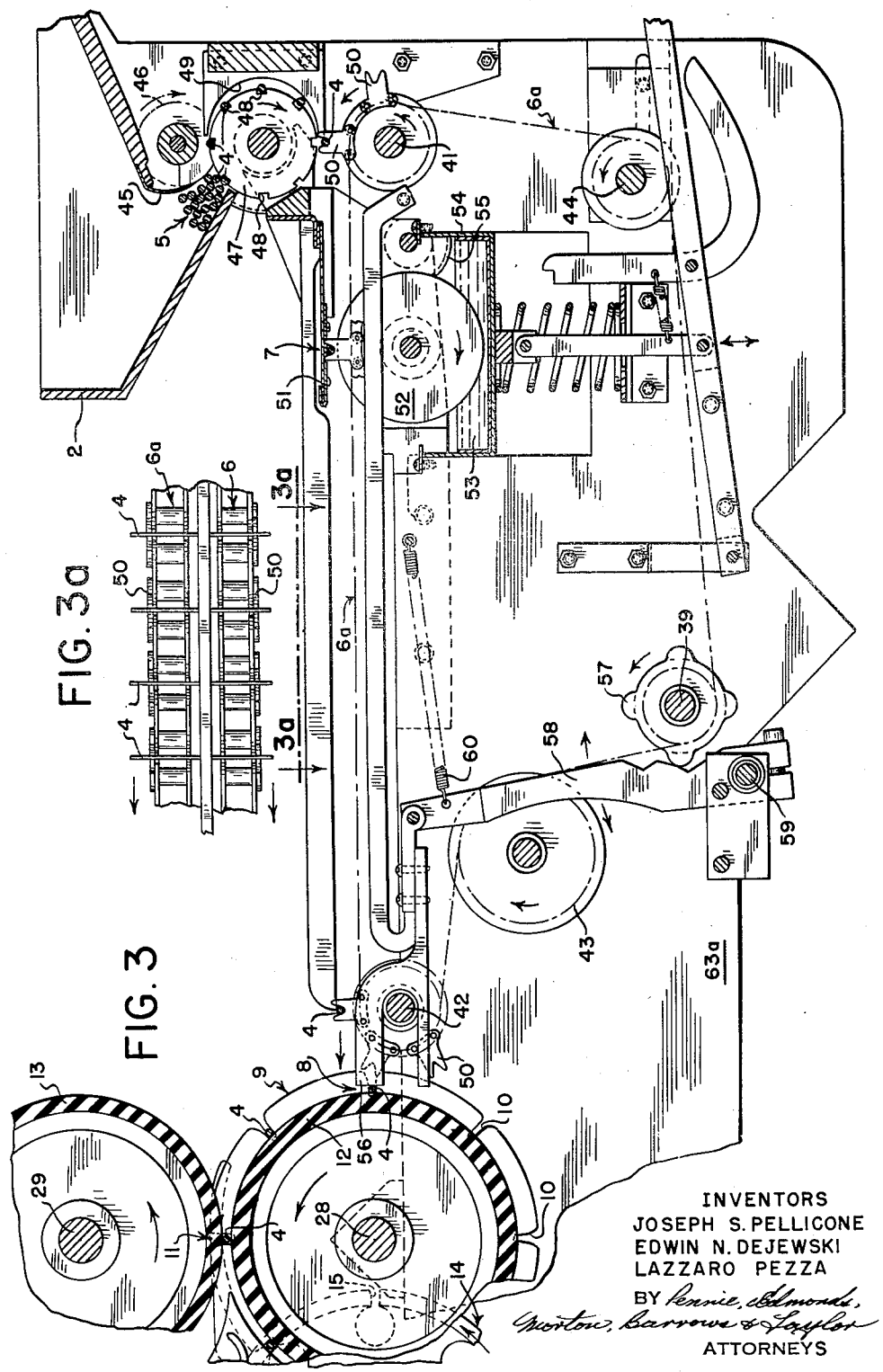

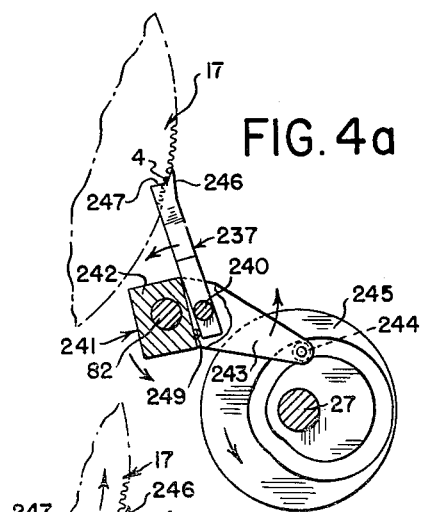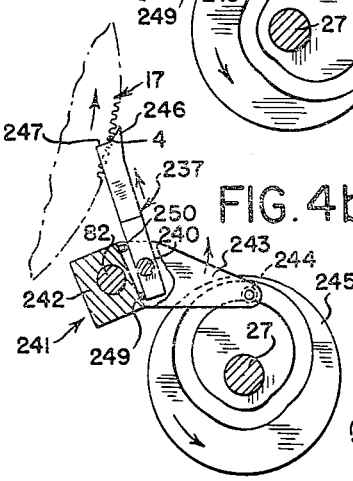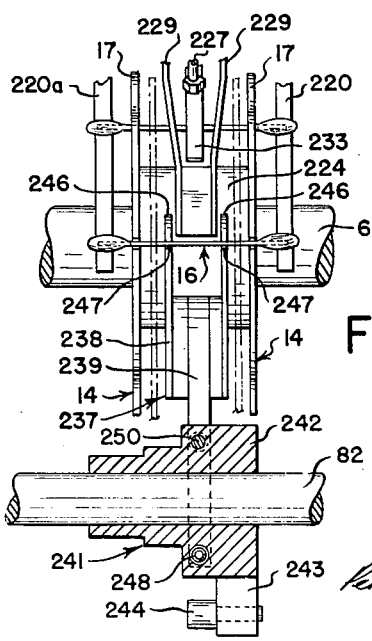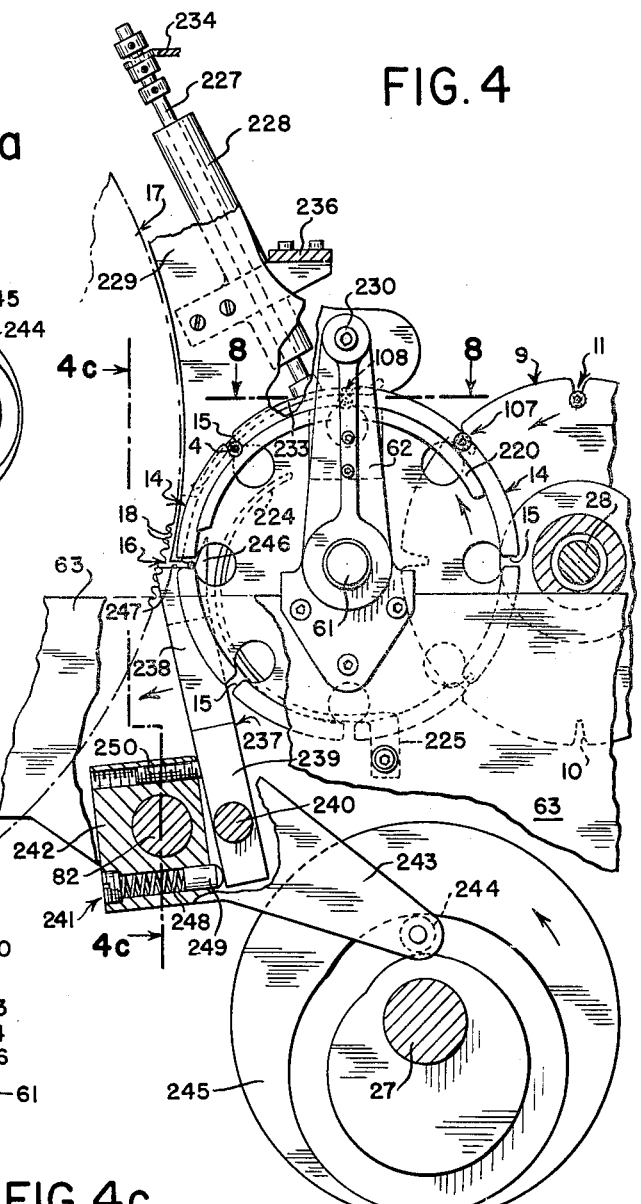

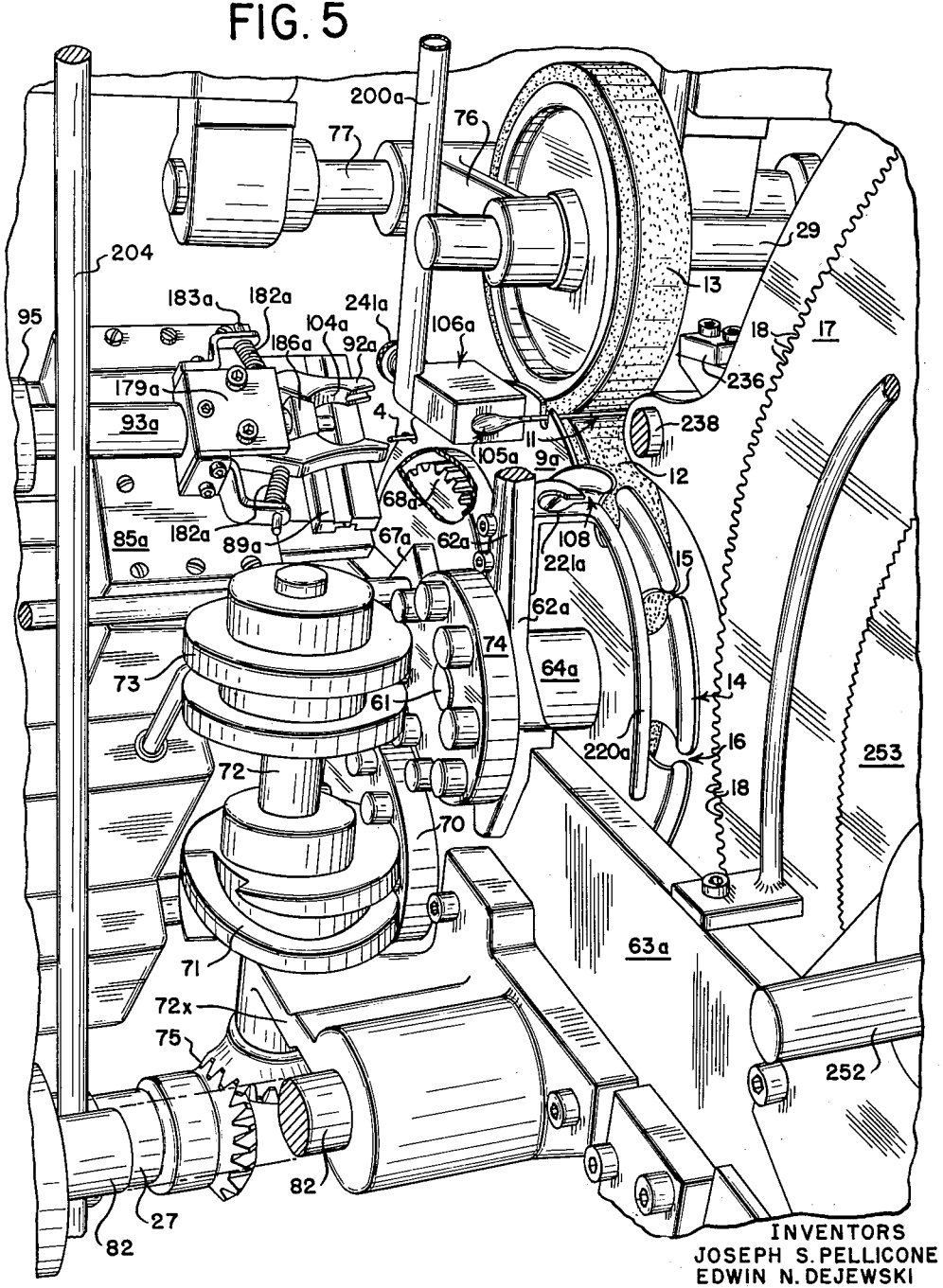

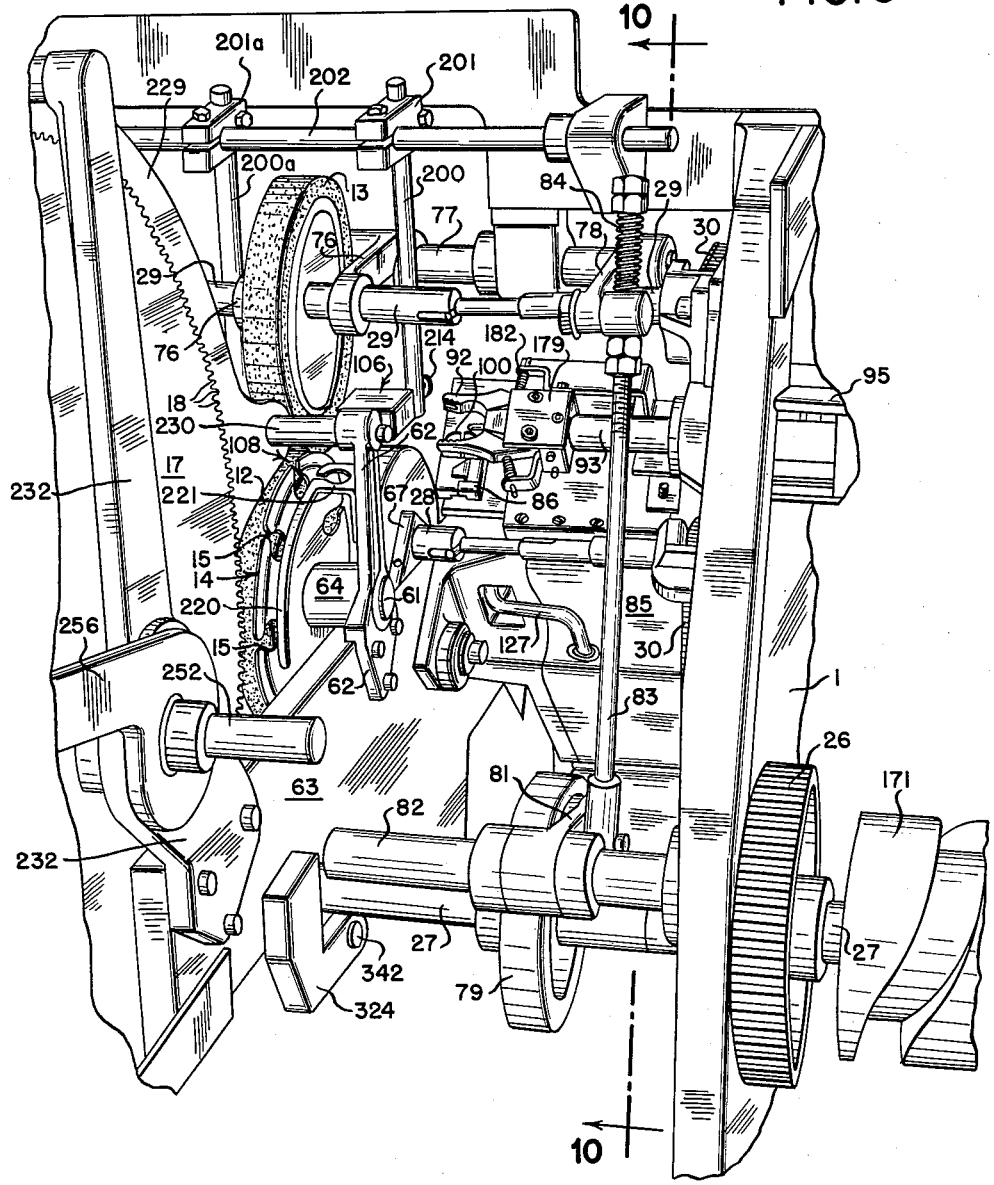

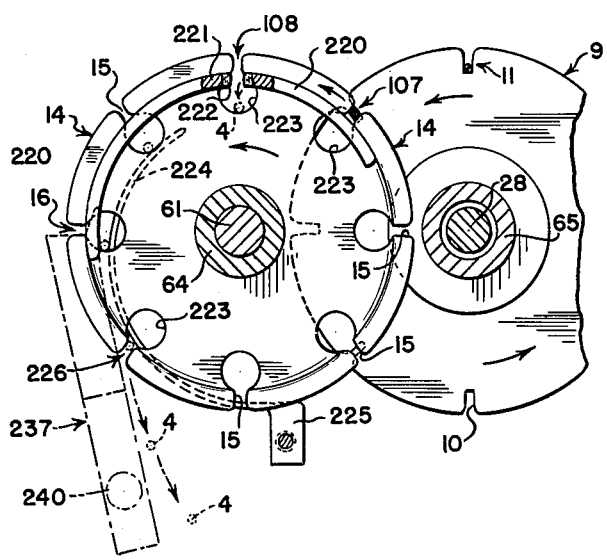
FIG. 7
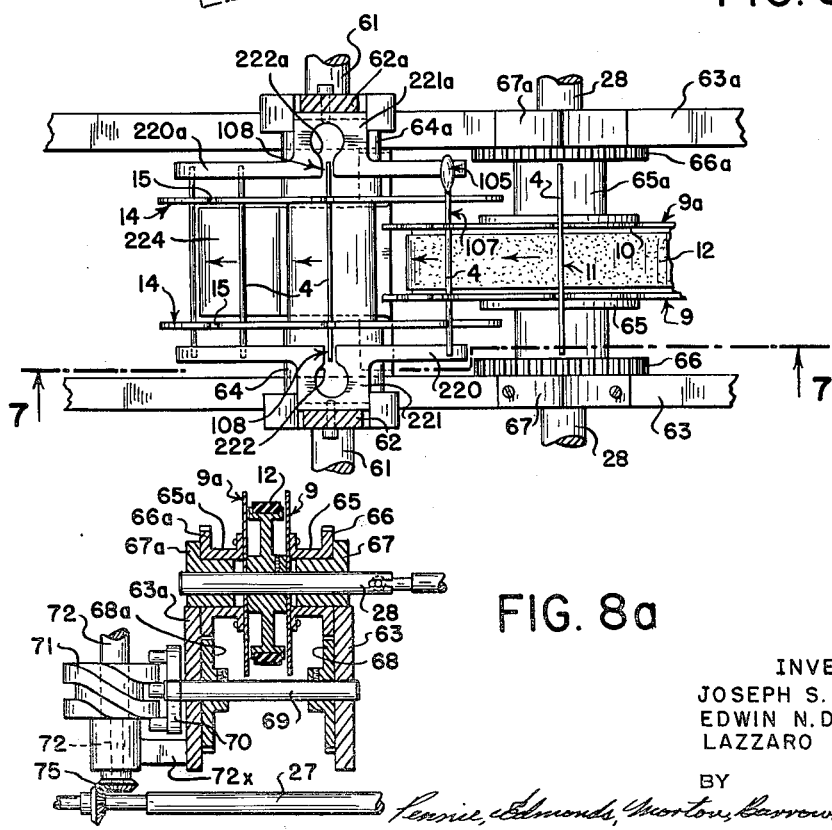
FIG. 8
FIG. 8a
INVENTORS
JOSEPH S. PELLICONE
EDWIN N. DEJEWSKI
LAZZARO PEZZA
BY
*Pennie, Edmonds, Morton, Barrows & Taylor*
ATTORNEYS

ATTORNEYS

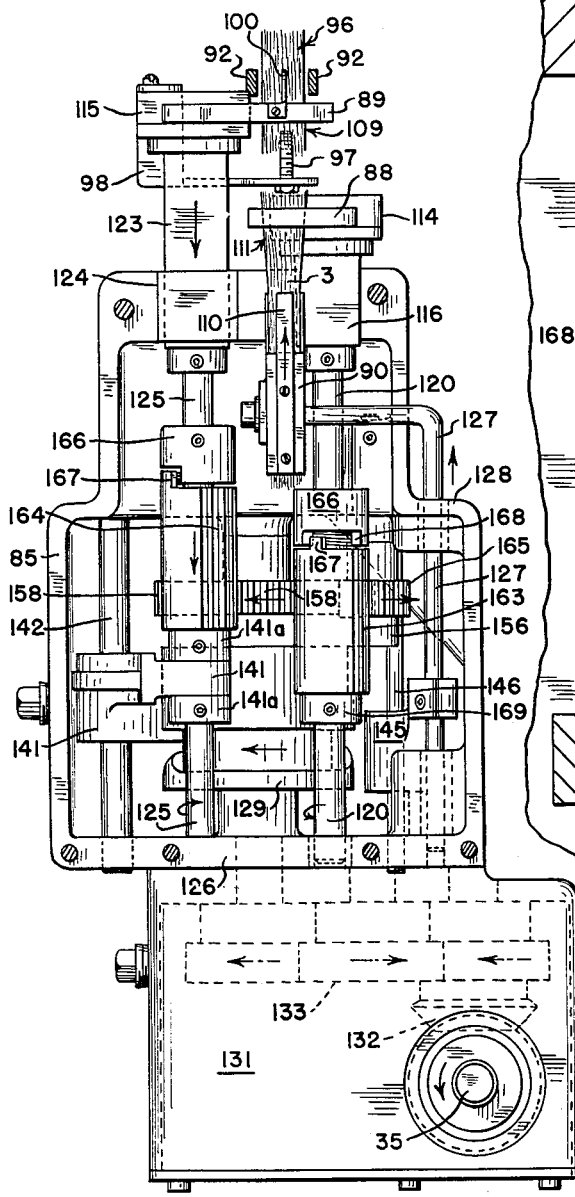
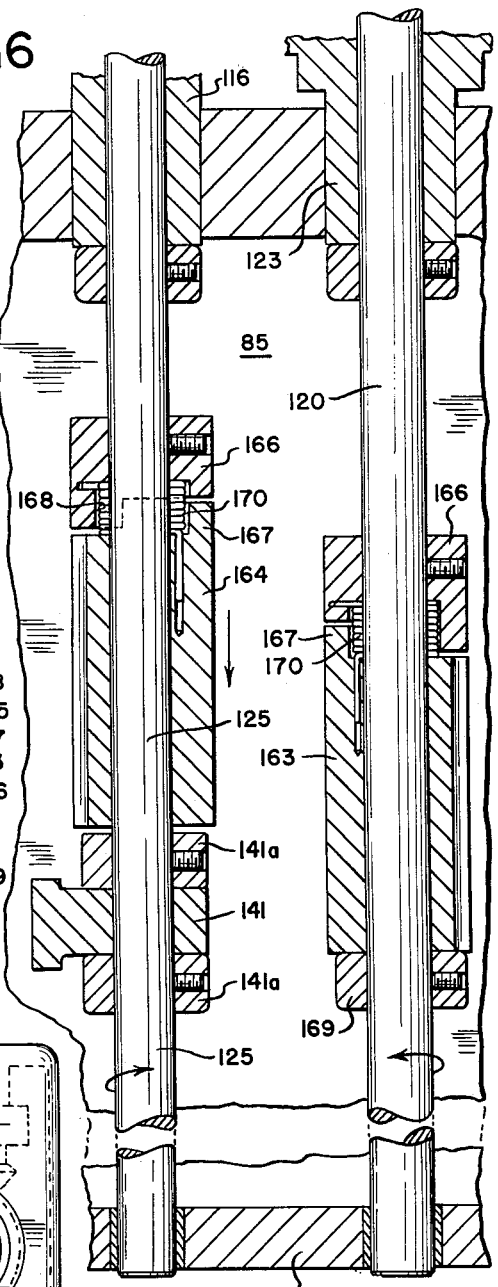

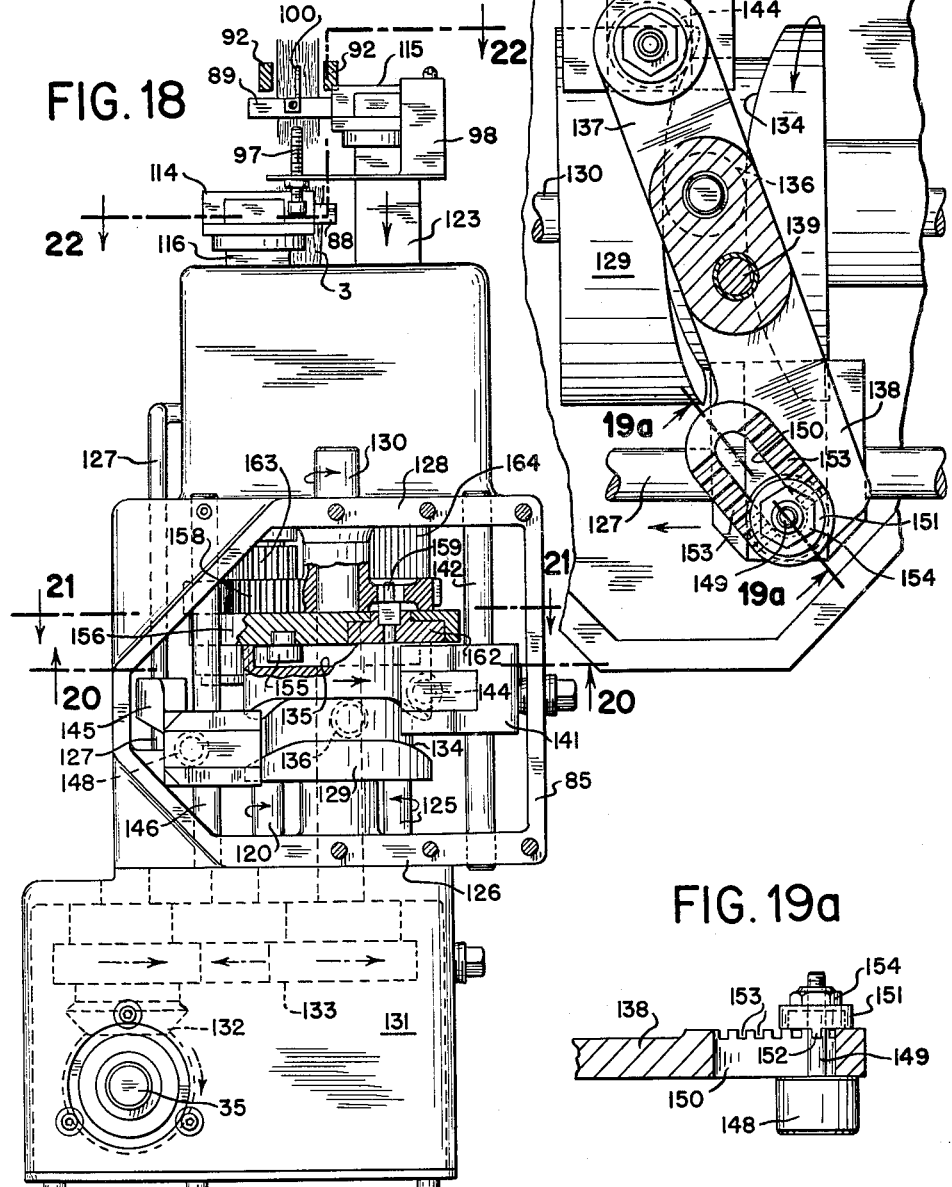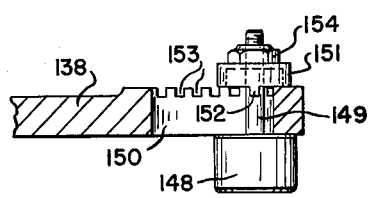

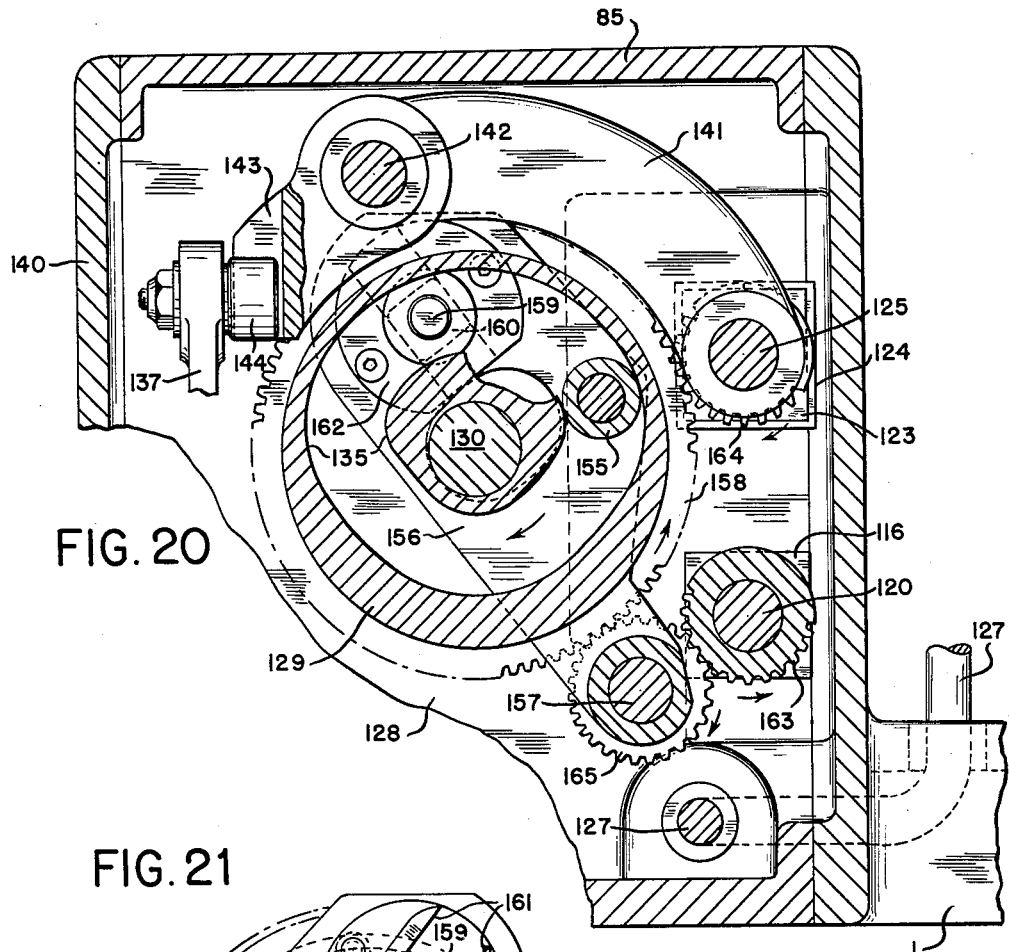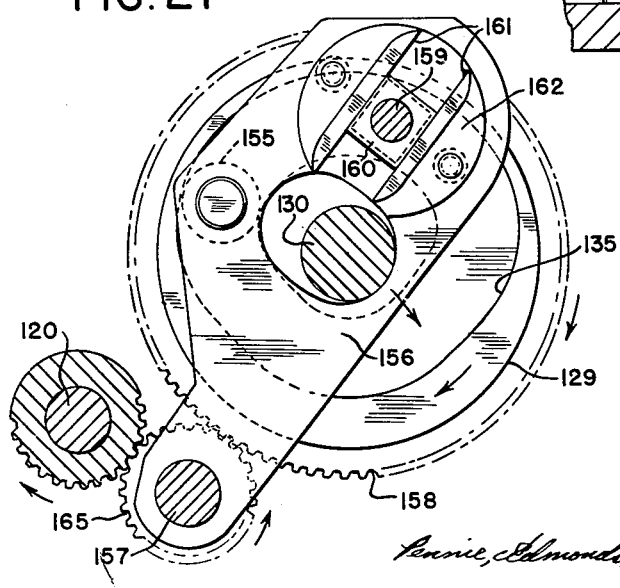

May 21, 1963   J. S. PELLICONE ET AL   3,090,080
SWAB MAKING APPARATUS
Filed Sept. 25, 1959   30 Sheets-Sheet 16

INVENTORS
JOSEPH S. PELLICONE
EDWIN N. DEJEWSKI
LAZZARO PEZZA
BY
Pennie, Edmonds, Morton, Barrows & Taylor
ATTORNEYS

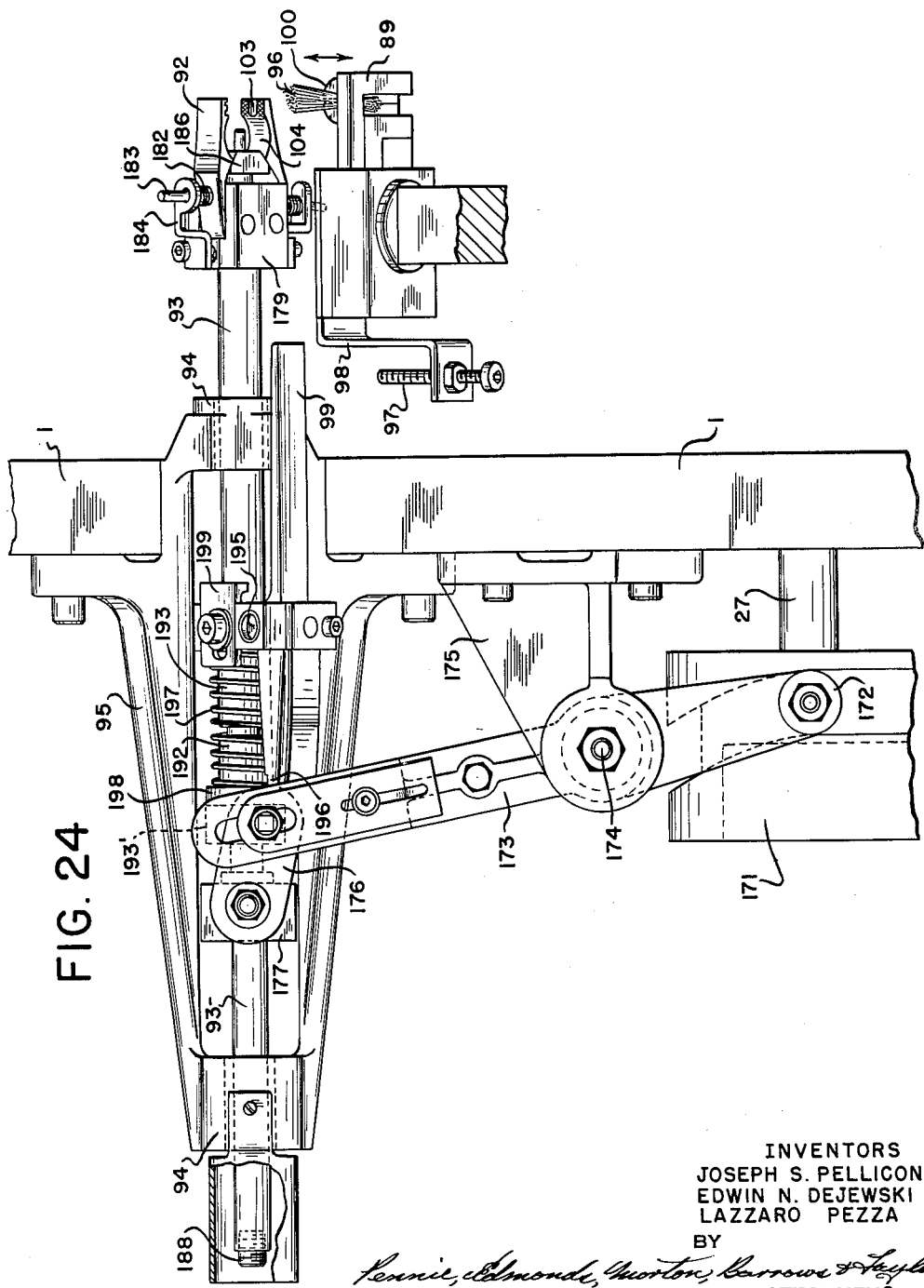

May 21, 1963 J. S. PELLICONE ET AL 3,090,080
SWAB MAKING APPARATUS
Filed Sept. 25, 1959 30 Sheets-Sheet 18
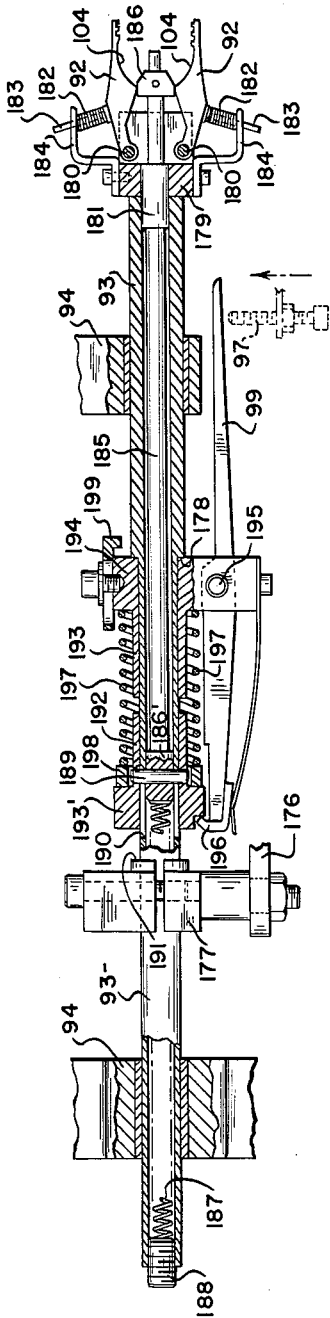
FIG. 25
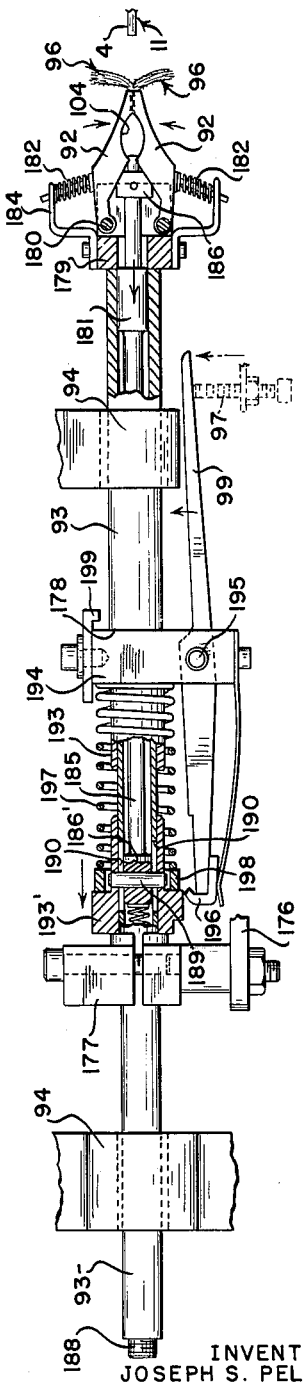
FIG. 26
INVENTORS
JOSEPH S. PELLICONE
EDWIN N. DEJEWSKI
LAZZARO PEZZA
BY
ATTORNEYS May 21, 1963 J. S. PELLICONE ET AL 3,090,080
SWAB MAKING APPARATUS
Filed Sept. 25, 1959 30 Sheets-Sheet 19

INVENTORS
JOSEPH S. PELLICONE
EDWIN N. DEJEWSKI
LAZZARO PEZZA
BY
ATTORNEYS

May 21, 1963 J. S. PELLICONE ET AL 3,090,080
SWAB MAKING APPARATUS
Filed Sept. 25, 1959 30 Sheets-Sheet 20
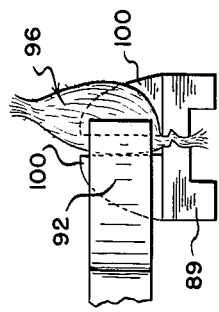
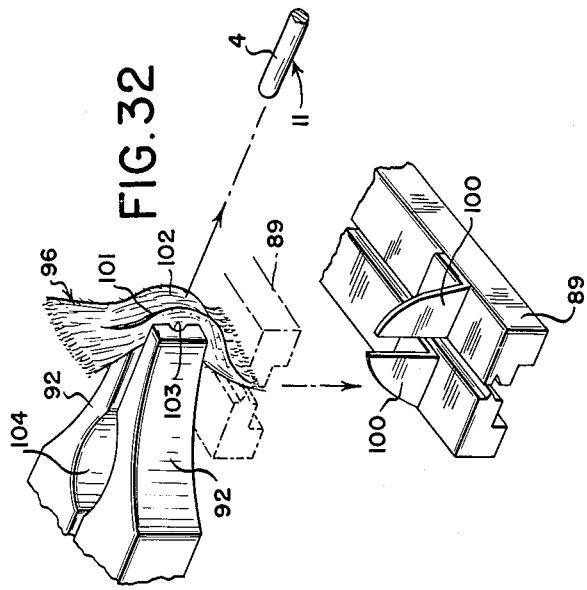
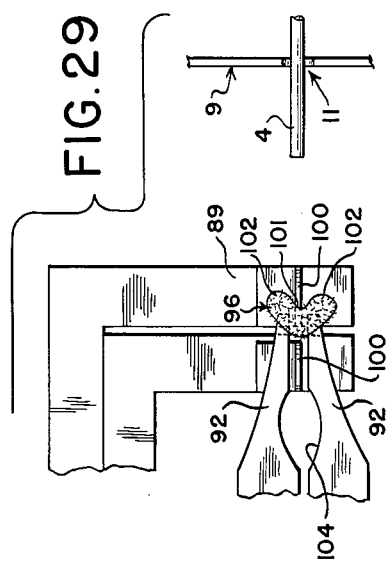
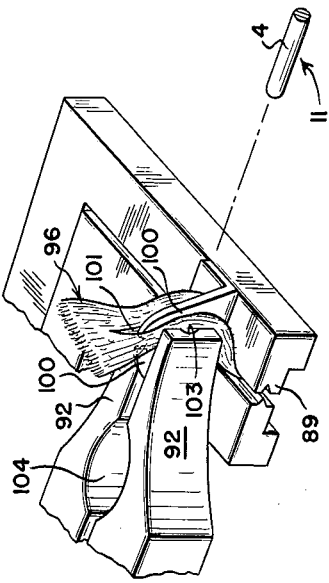
INVENTORS
JOSEPH S. PELLICONE
EDWIN N. DEJEWSKI
LAZZARO PEZZA
BY
Pennie, Edmonds, Morton, Barrows & Taylor
ATTORNEYS May 21, 1963 J. S. PELLICONE ET AL 3,090,080
SWAB MAKING APPARATUS
Filed Sept. 25, 1959 30 Sheets-Sheet 21
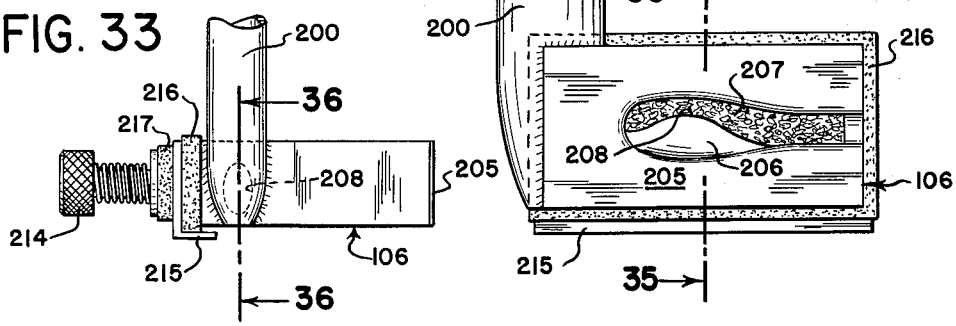
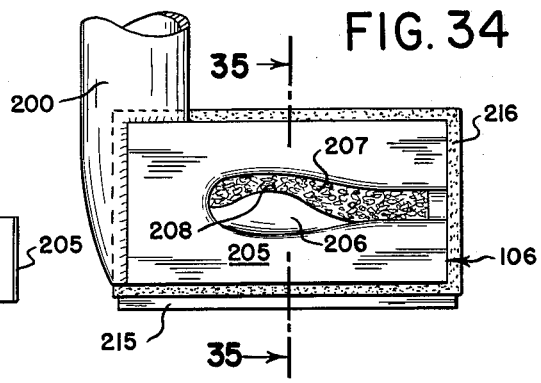
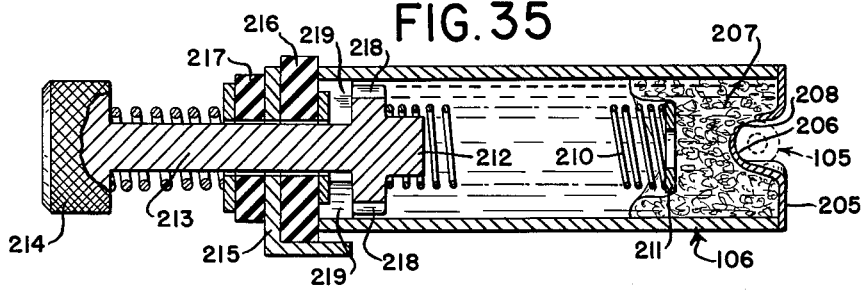
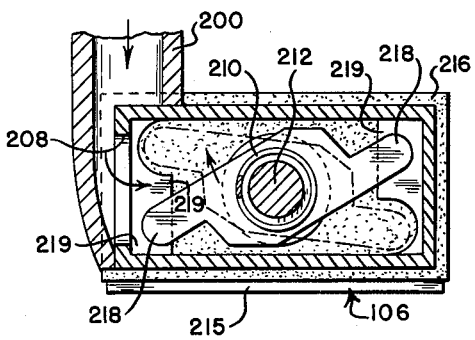
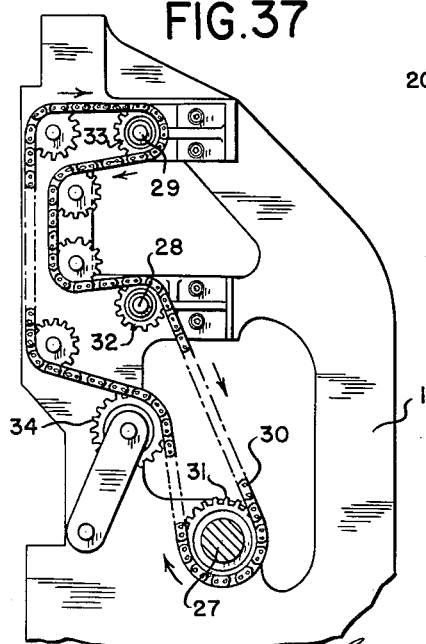
INVENTORS
JOSEPH S. PELLICONE
EDWIN N. DEJEWSKI
LAZZARO PEZZA
BY
ATTORNEYS

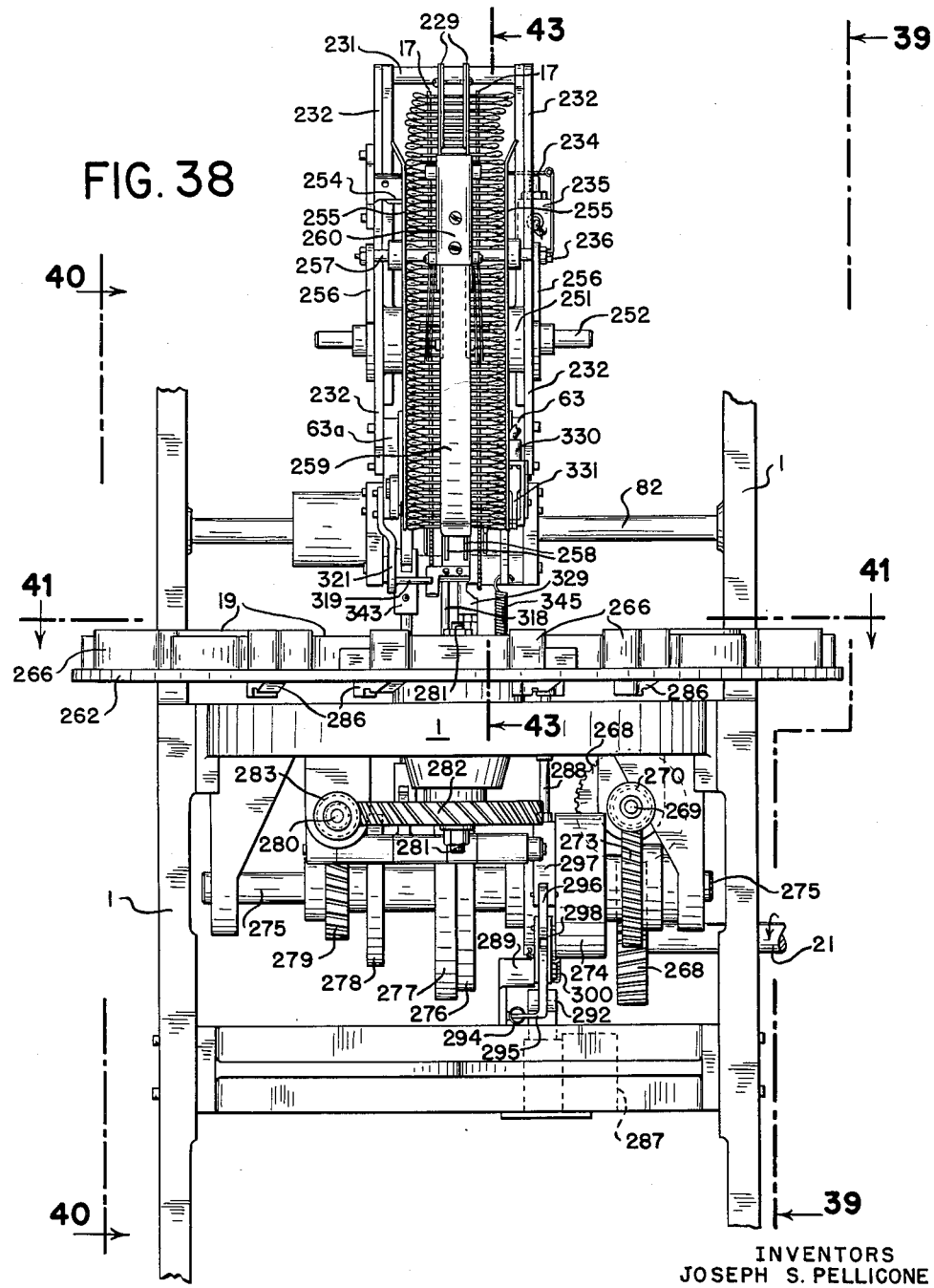

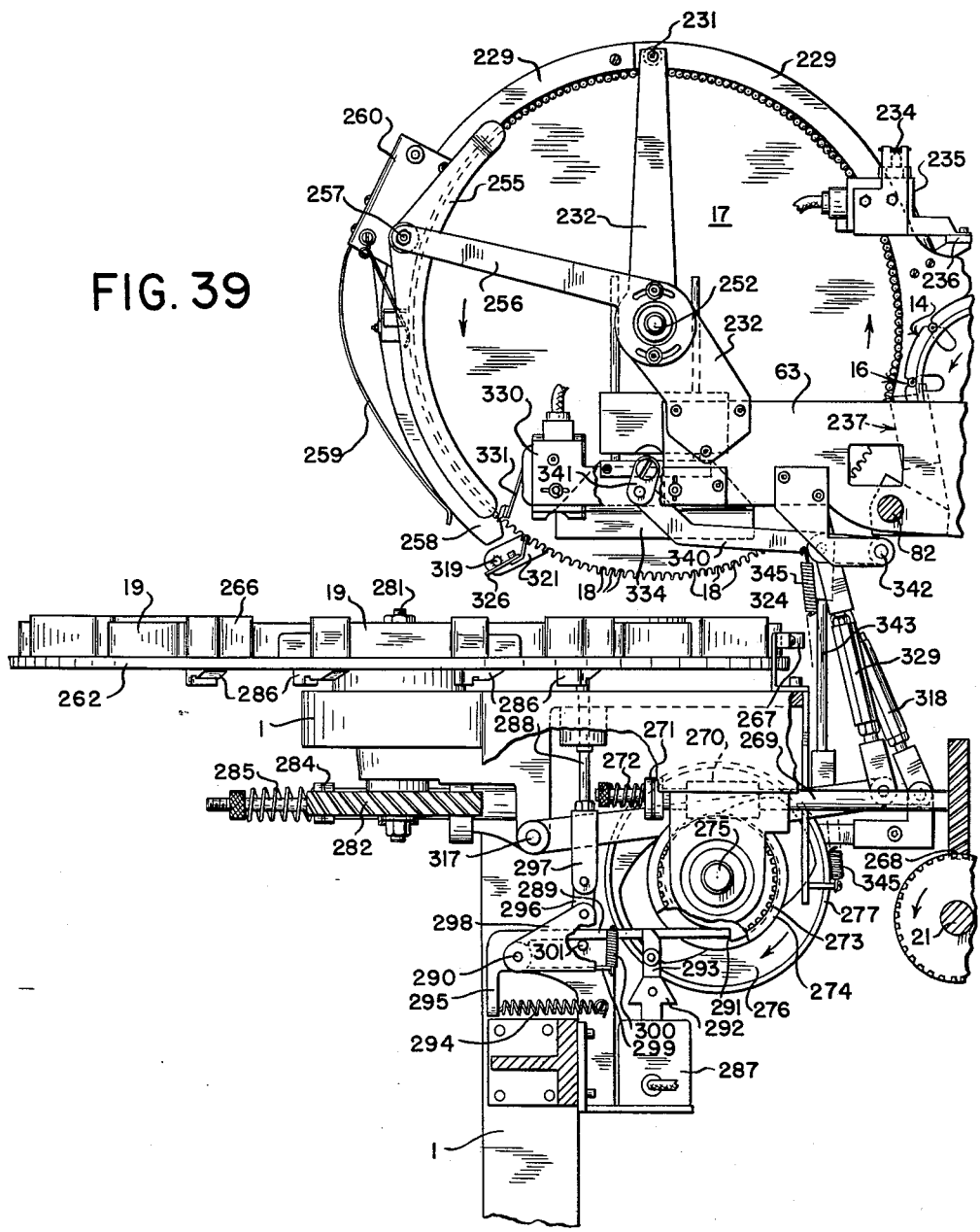

May 21, 1963    J. S. PELLICONE ET AL    3,090,080
SWAB MAKING APPARATUS
Filed Sept. 25, 1959    30 Sheets-Sheet 25
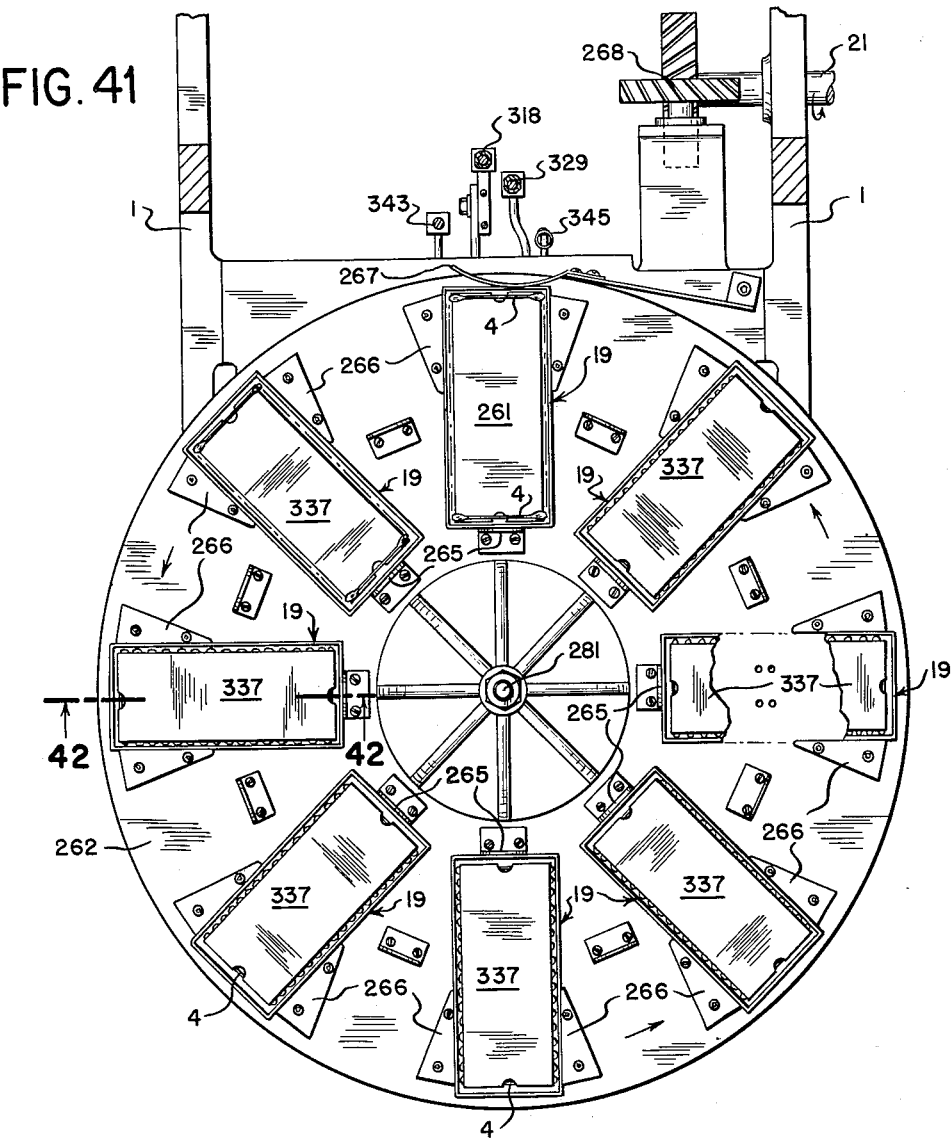
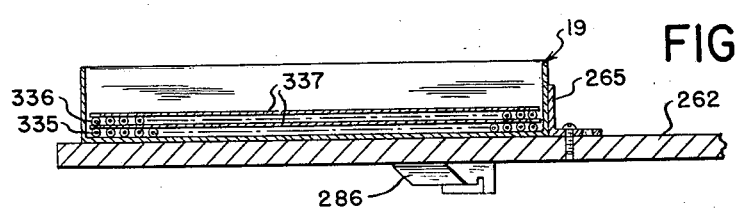
INVENTORS
JOSEPH S. PELLICONE
EDWIN N. DEJEWSKI
LAZZARO PEZZA
BY
ATTORNEYS

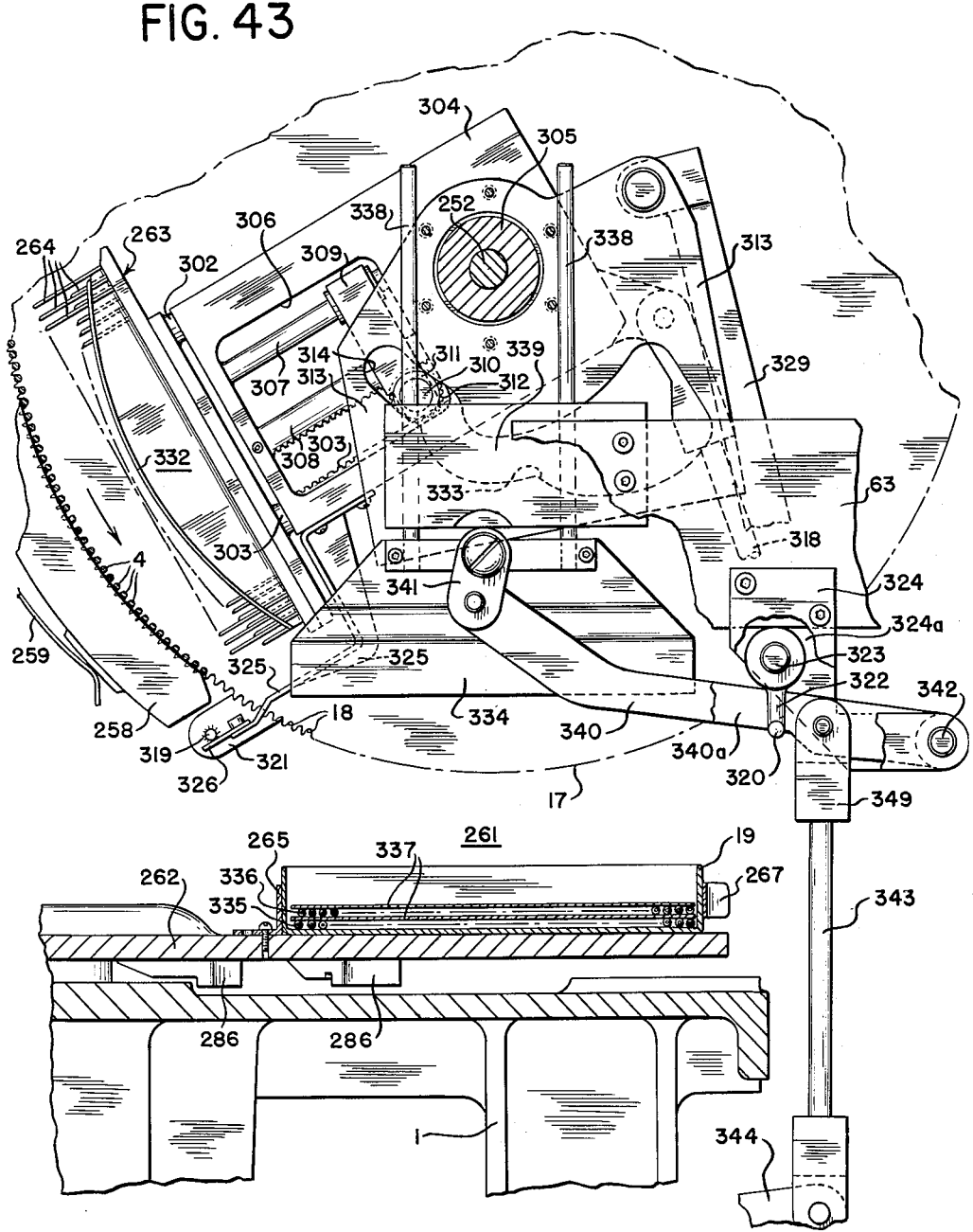

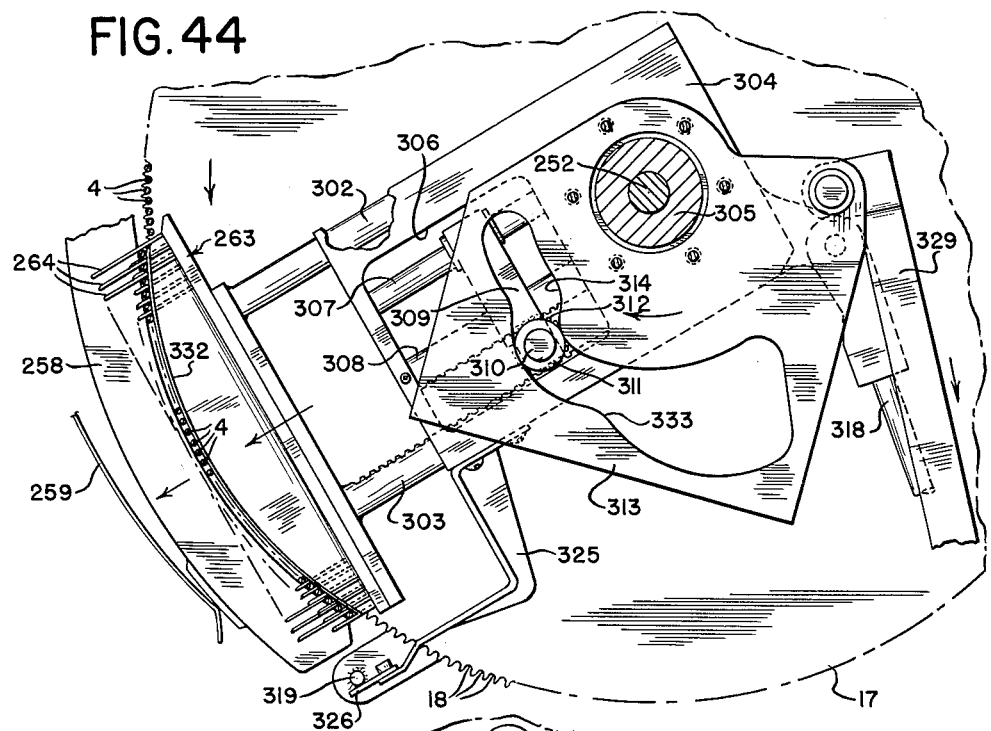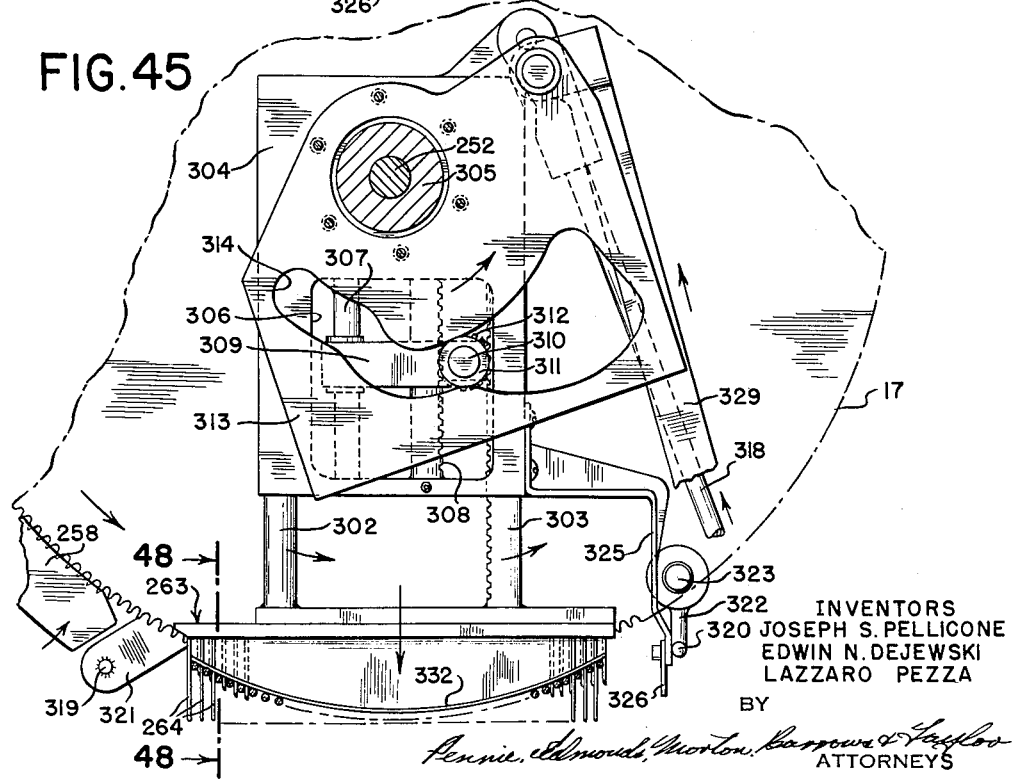

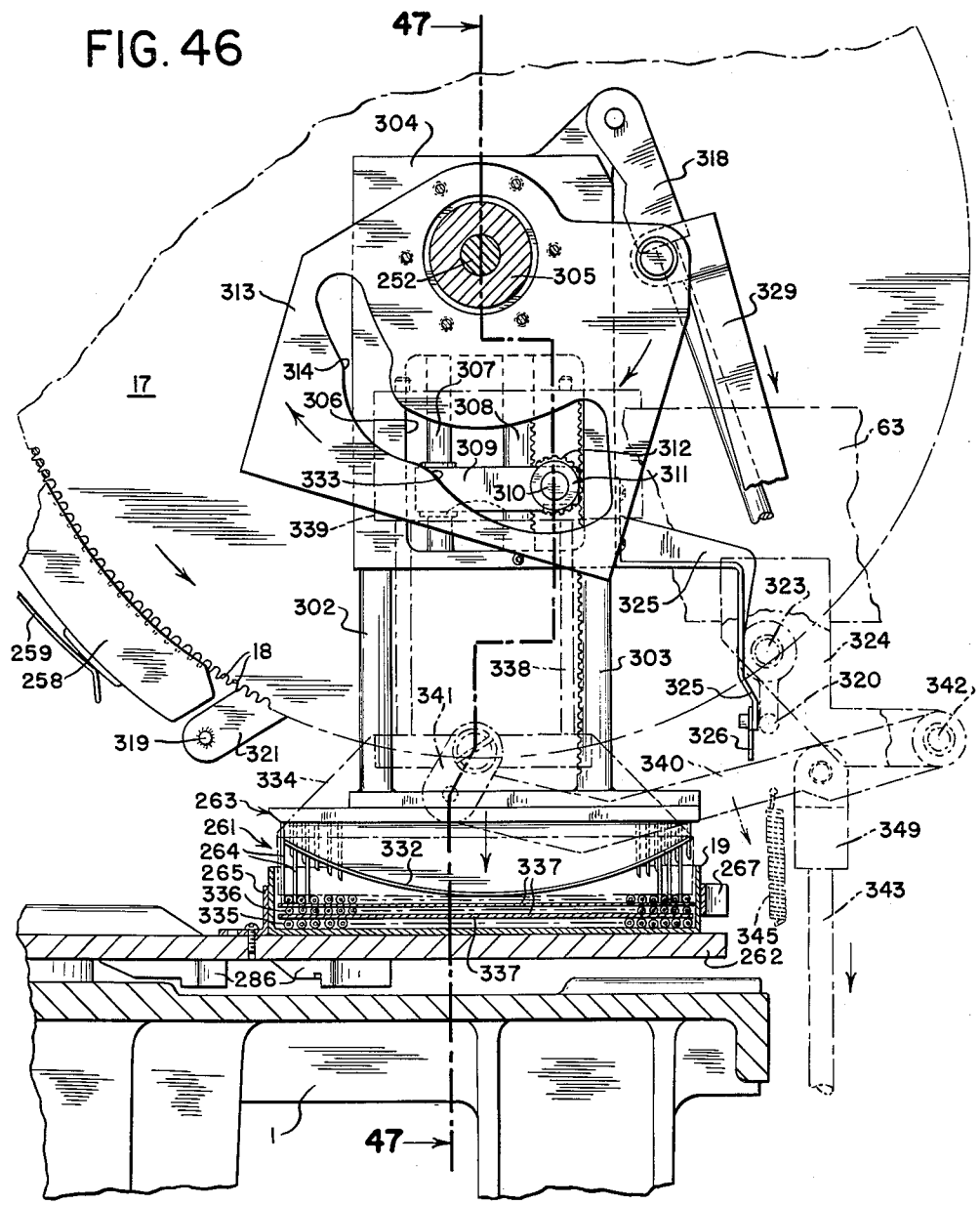

May 21, 1963　　J. S. PELLICONE ET AL　　3,090,080
SWAB MAKING APPARATUS
Filed Sept. 25, 1959　　30 Sheets-Sheet 29

INVENTORS
JOSEPH S. PELLICONE
EDWIN N. DEJEWSKI
LAZZARO PEZZA
BY
*Pennie, Edmonds, Morton, Barrows & Taylor*
ATTORNEYS May 21, 1963   J. S. PELLICONE ET AL   3,090,080
SWAB MAKING APPARATUS
Filed Sept. 25, 1959   30 Sheets-Sheet 30
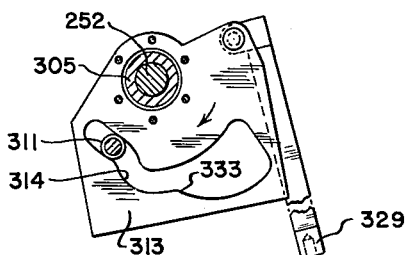
FIG. 50
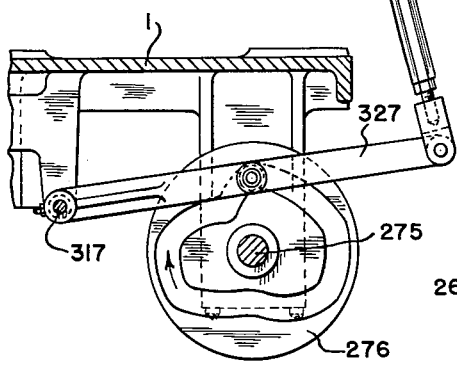
FIG. 51
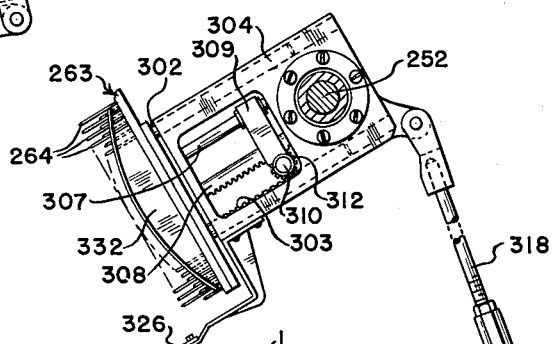
FIG. 52
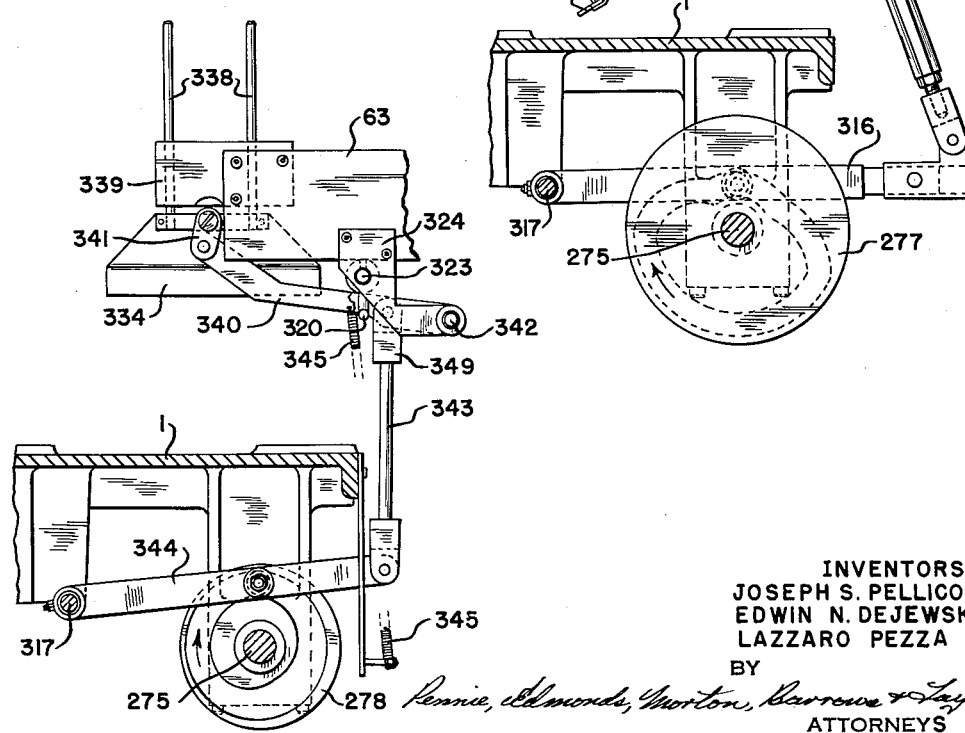
INVENTORS
JOSEPH S. PELLICONE
EDWIN N. DEJEWSKI
LAZZARO PEZZA
BY
Pennie, Edmonds, Morton, Barrows & Taylor
ATTORNEYS 3,090,080
Patented May 21, 1963

3,090,080
SWAB MAKING APPARATUS
Joseph S. Pellicone, Brooklyn, Edwin N. Dejewski, New York, and Lazzaro Pezza, Bronx, N.Y., assignors to Chesebrough-Pond's Inc., a corporation of New York
Filed Sept. 25, 1959, Ser. No. 842,511
36 Claims. (Cl. 19—145.3)

This invention relates to improvements in automatic machines for making swabs or applicators which consist of sticks or stems having a formed tip of soft fibrous material such as cotton secured to and projecting from one or both ends thereof. Although it is advantageous to form the tips of cotton, other materials may be used if desired, and accordingly the term "cotton" as employed throughout this specification will be understood to include any suitable tip material.

The invention relates more particularly to machines of this kind wherein the sticks are preformed to uniform length and diameter and are fed to the machine from a hopper, and after adhesive has been applied to the stick and while it is being twirled by grasping its central portion between rotating rubber faced rollers, a tuft or wad of cotton is applied, usually to each end simultaneously. The cotton may, however, be applied to only one end. While the stick continues to rotate, the cotton is appropriately shaped to complete the swab, and the swabs are then delivered for boxing in cartons.

The present invention relates to improvements in machines of this kind, and the construction, arrangement and advantages of the improved apparatus will be understood from a consideration of the accompanying drawings, the novel features being set forth in the appended claims. The drawings illustrate a machine for making double-tipped swabs, but it will be understood that should it be desired to make swabs having a cotton tip at one end only, certain parts of the machine may either be omitted on one side thereof, or operatively disconnected. In these drawings:

FIG. 1 is a perspective view looking from the right rear quarter of the swab-making machine, the rear being the intake side for the two ribbons of cotton and for the sticks which are fed in from a hopper;

FIG. 1a is a perspective view of the double-tipped product of the machine, namely, a swab with cotton tips at both ends;

FIG. 2 is a perspective view similar to FIG. 1 looking at the machine from the right front quarter, mechanism for automatically packing the swabs in boxes being located at the front side of the machine;

FIG. 3 is a vertical section approximately on line 3—3 of FIG. 1 taken centrally through the machine from the rear to the point where the sticks are twirled between rubber faced rollers and the cotton tips applied;

FIG. 3a is a transverse section taken on line 3a—3a of FIG. 3;

FIG. 4 is a central vertical section similar to FIG. 3, showing mechanism for transferring the completed swabs from the twirling position to the box-loading mechanism;

FIGS. 4a and 4b are detailed sectional views showing, in different positions, a part of the mechanism illustrated in FIG. 4;

FIG. 4c is a detail section taken on line 4c—4c of FIG. 4;

FIG. 5 is a partial perspective view drawn to a larger scale than FIGS. 1 and 2 showing mechanism in the vicinity of the twirling position, this view looking from the left front quarter of the machine;

FIG. 6 is a view similar to FIG. 5 but looking from the opposite or right front quarter;

FIG. 7 is a vertical section taken on line 7—7 of FIG. 8;

FIG. 8 is a fragmentary sectional plan taken on line 8—8 of FIG. 4;

FIG. 8a is a vertical section taken on line 8a—8a of FIG. 9;

Figure 9:
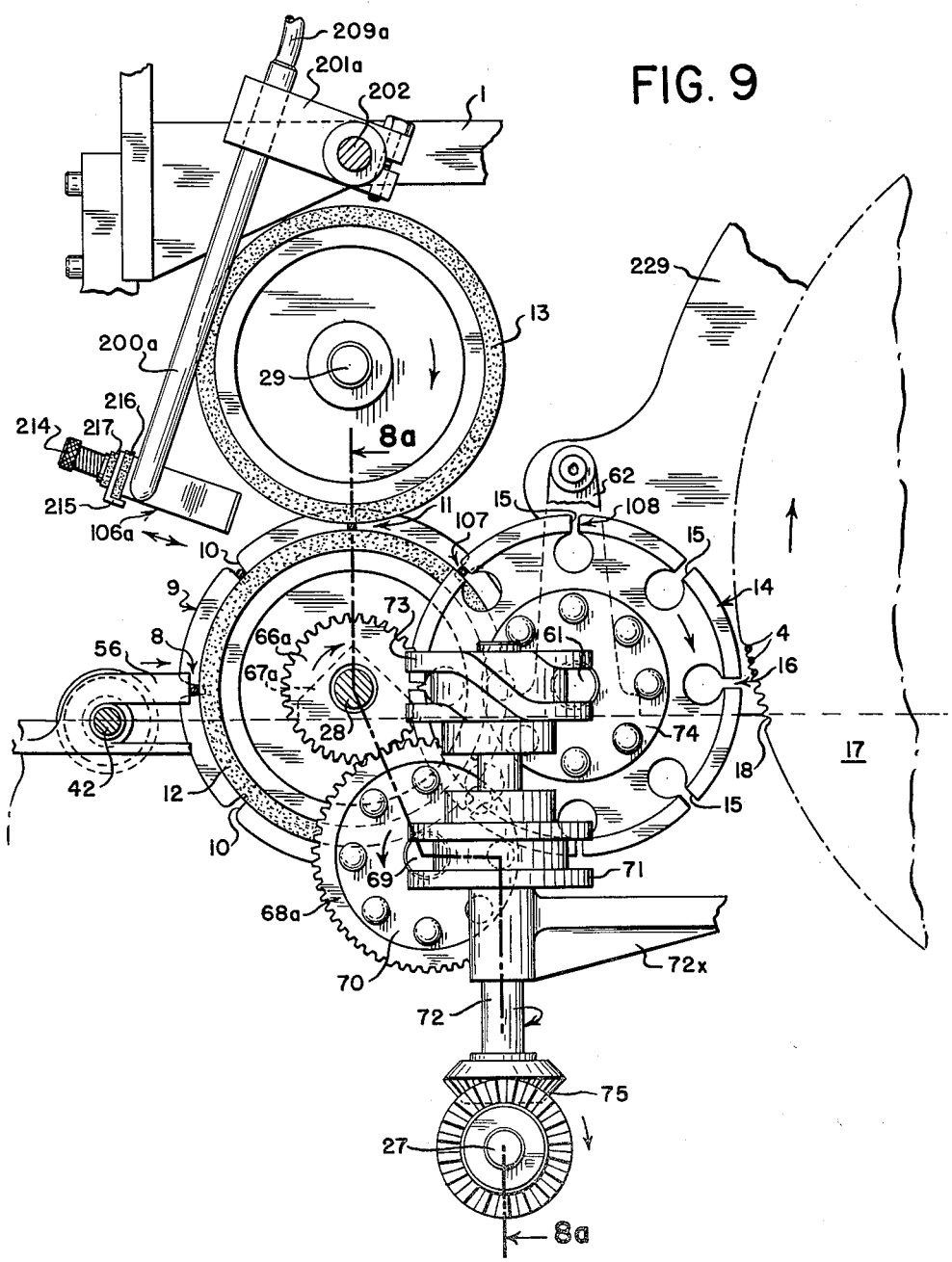
FIG. 9 is a view somewhat similar to FIG. 4, but including parts shown at the left of FIG. 3, and also showing a step-drive or indexing mechanism.
Figure 11:
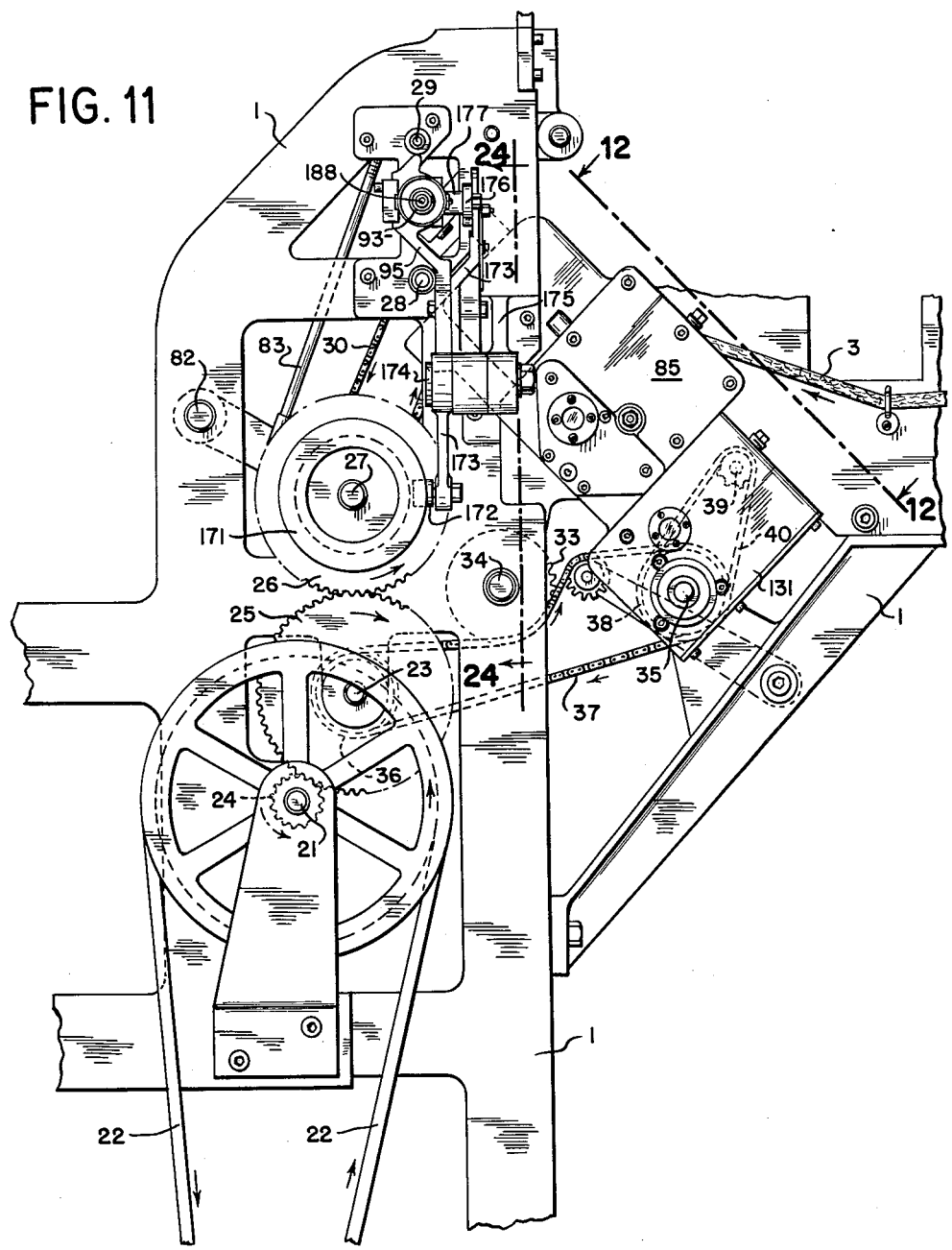
Figure 12:
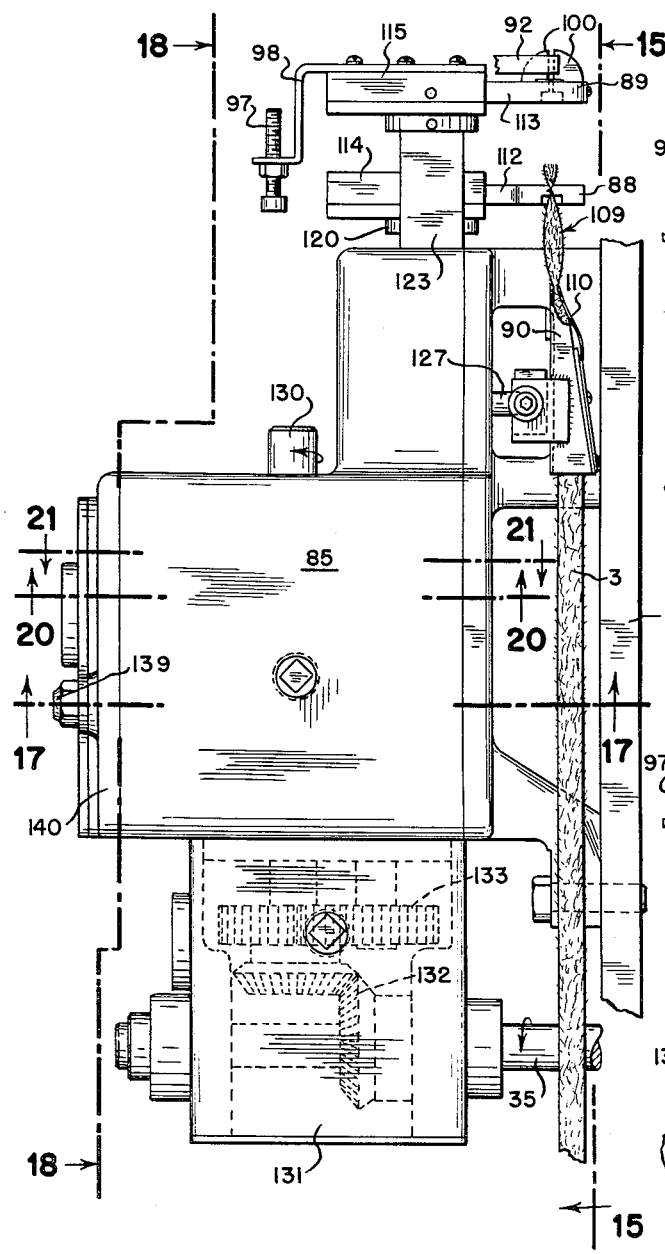
Figure 13:
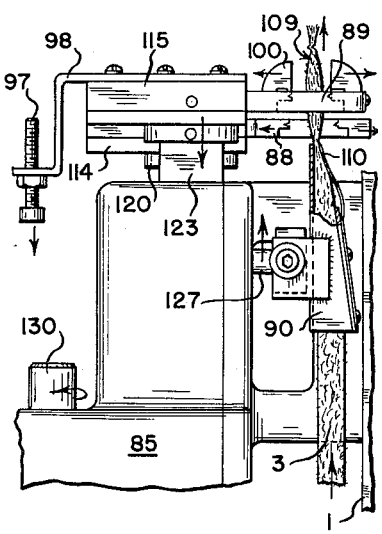
Figure 14:
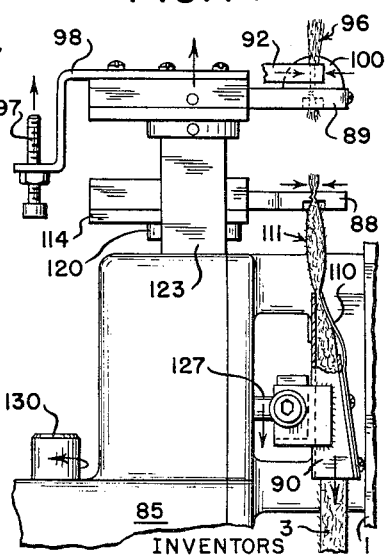
Figure 17:
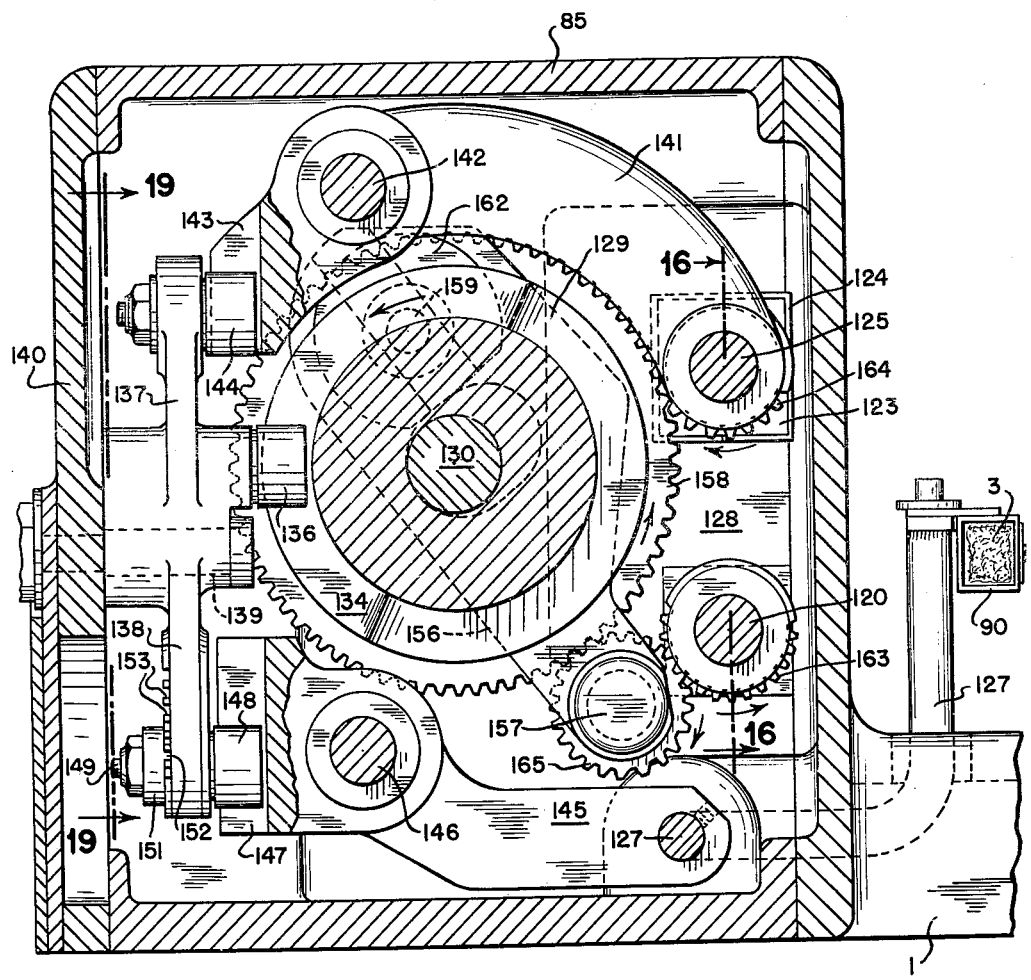
Figure 22:
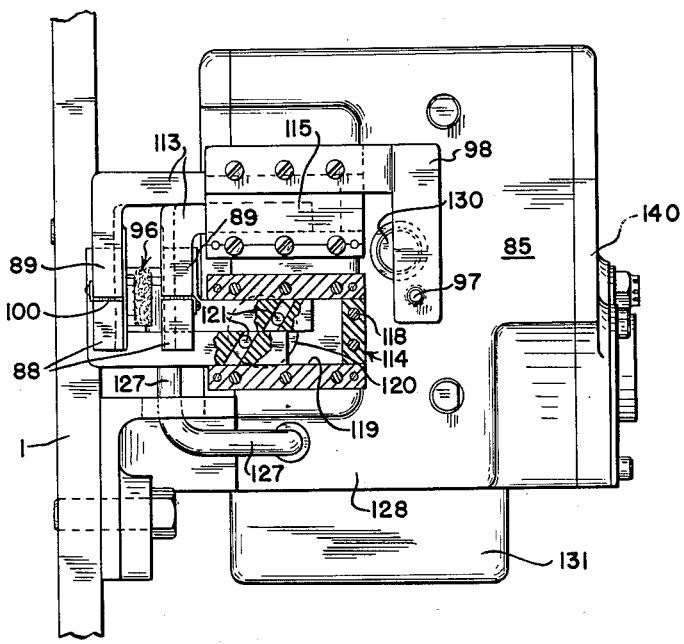
Figure 23:
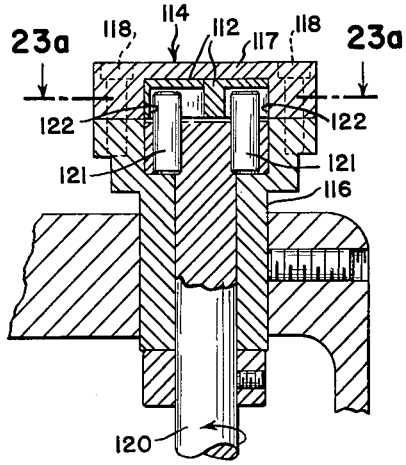
Figure 23A:
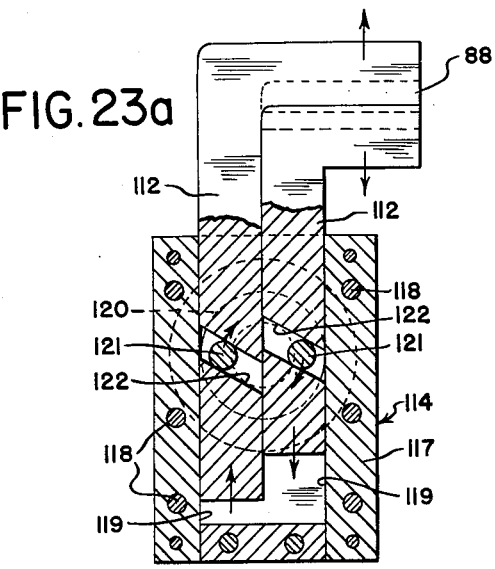
Figure 40:
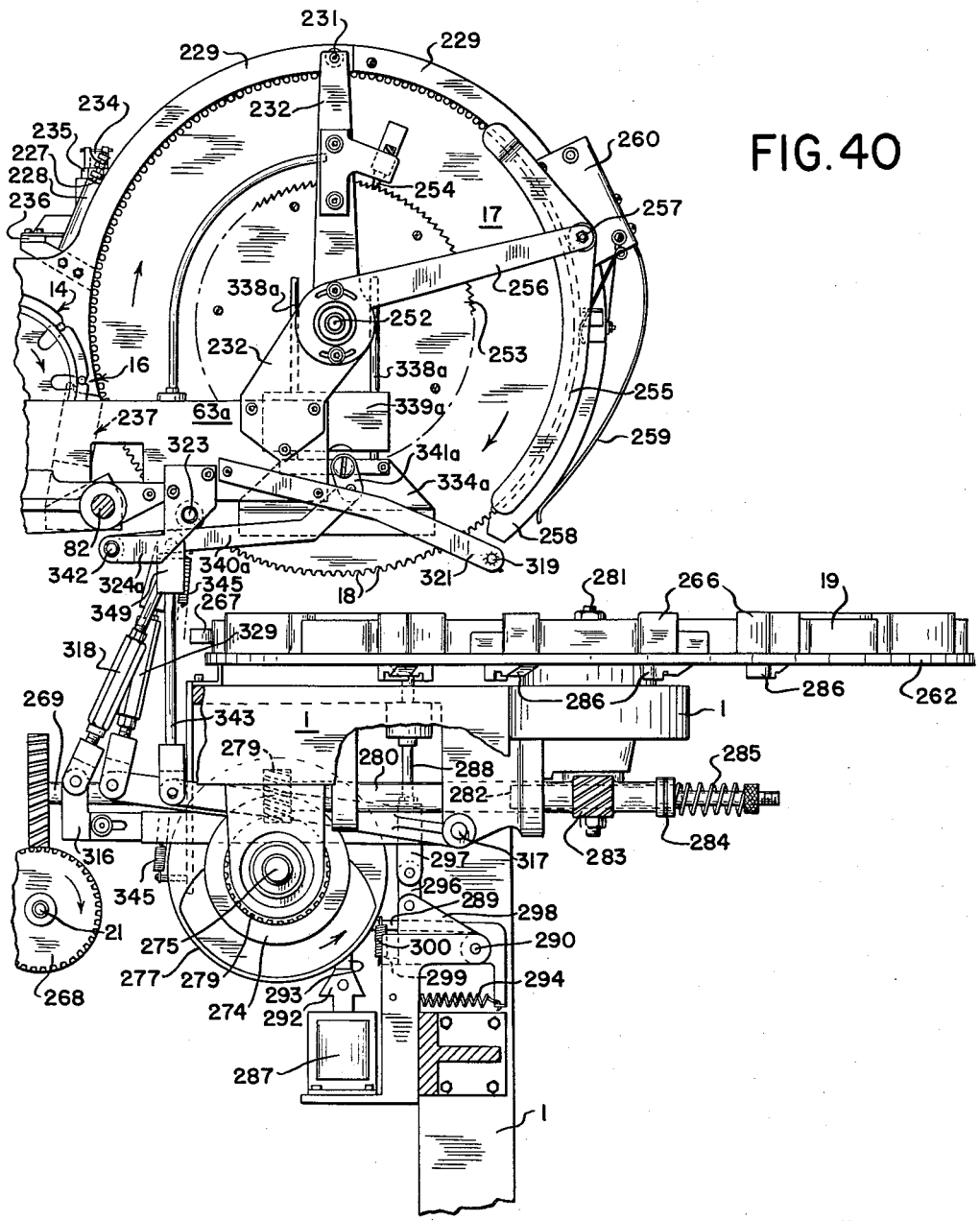
Figure 47:
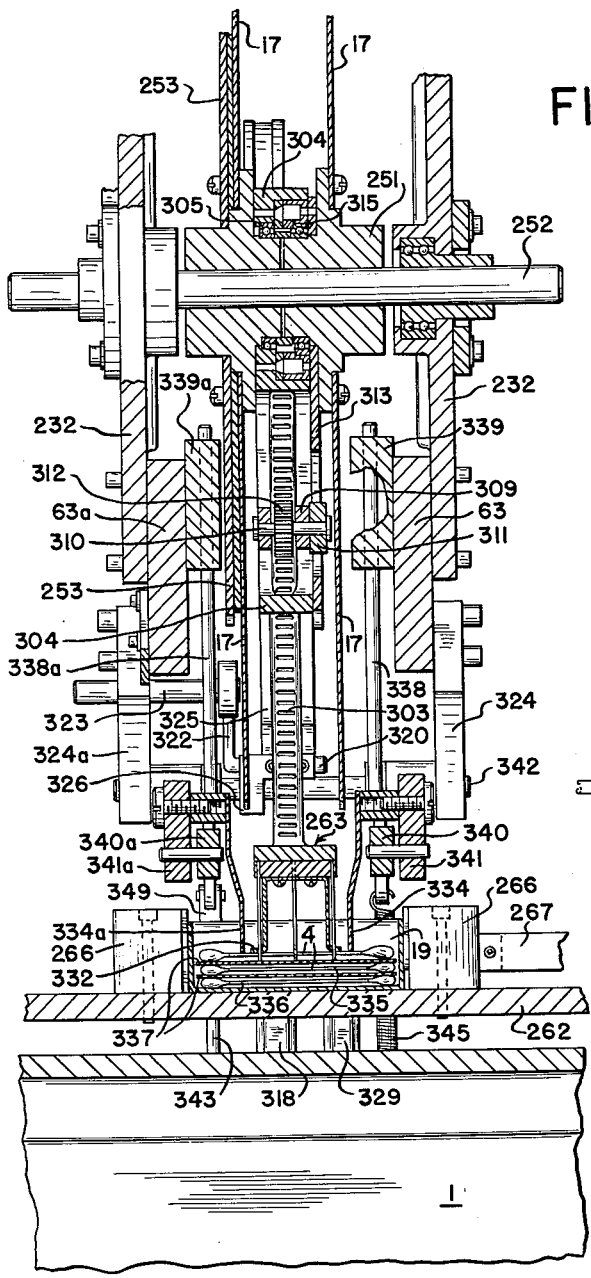
Figure 48:
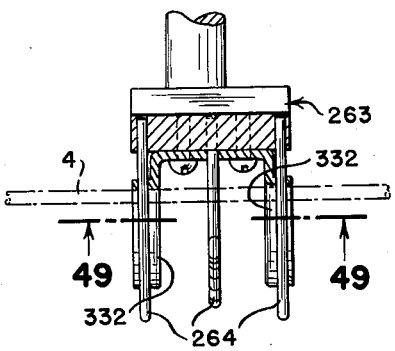
Figure 49:
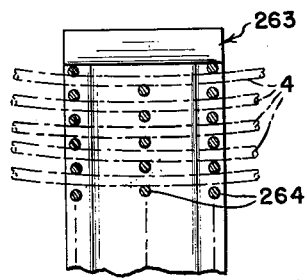

FIGS. 11–23a illustrate the mechanism for measuring successive lengths of cotton to form tufts of uniform size and deliver them to the tuft transfer mechanism which applies them to the twirling sticks. It will be understood that such mechanisms are provided on both sides of the machine so as to supply the tufts to both ends of the sticks. However, should it be desired to make single tipped swabs, one of these mechanisms may be either omitted or operatively disconnected;

FIG. 11 is a view in elevation of a portion of the machine looking from the right side in FIGS. 1 and 2 and showing the location of the tuft measuring and transfer mechanisms, and part of the main drive for the machine;

FIG. 12 is a plan view of the measuring mechanism as indicated by line 12—12 of FIG. 11;

FIGS. 13 and 14 are fragmentary views showing a portion of FIG. 12 with parts in different positions;

FIG. 15 is a view looking from the right of FIG. 12 as indicated by line 15—15 on that figure with the cover removed. The removed cover is on the inner or left-hand face of the mechanism housing as viewed in FIG. 11;

FIG. 16 is a detail vertical section taken on line 16—16 of FIG. 17;

FIG. 17 is a vertical section taken on line 17—17 of FIG. 12;

FIG. 18 is a view similar to FIG. 14, but taken on line 18—18 of FIG. 12 and looking from the left of that figure, the outer or right-hand cover being removed;

FIG. 19 is a fragmentary vertical section taken on line 19—19 of FIG. 17;

FIG. 19a is a detail section taken on line 19a—19a of FIG. 19;

FIG. 20 is a vertical section similar to FIG. 17 but taken on line 20—20 of FIGS. 12 and 18;

FIG. 21 is a fragmentary vertical section taken on line 21—21 of FIGS. 12 and 18, looking in the direction of the arrows;

FIG. 22 is a view partially in end elevation and partially in section taken on line 22—22 of FIG. 18, but showing the jaws in open position;

FIG. 23 is a central detail sectional view taken at right angles to the plane of the section shown in FIG. 22, but with the jaws in closed position;

FIG. 23a is a view partly in elevation and partly in section taken on line 23a—23a of FIG. 23;

FIG. 24 is a side view of the transfer or tuft-apply mechanism looking in the direction of the arrows 24—24 of FIG. 11;

FIGS. 25, 26, 27 and 28 are central longitudinal sections of the tube-like mounting for the transfer jaws, showing the jaws in different positions, these sections being taken in the plane of the jaws and parts being shown broken away;

FIGS. 29–32 are detailed fragmentary views of the jaws of the tuft-forming and tuft-applying or transfer mechanisms showing the shaping of a tuft and application thereof to one end of the twirling stick;

FIG. 29 is a view of the jaws of these mechanisms as viewed in FIG. 24 from the upper side of that figure and at right angles to the jaws;

FIG. 30 is a plan view of the parts shown in FIG. 31;

FIG. 31 is a perspective view of the jaws shown in FIG. 29;

FIG. 32 is a similar perspective view with the jaws of the tuft-forming mechanism in withdrawn position;

FIG. 33 is an enlarged view of the tip shaper shown in FIGS. 5 and 9;

FIG. 34 is a view of the shaper shown in FIG. 33 looking toward the right end and drawn to an enlarged scale;

FIG. 35 is a transverse section taken on line 35—35 of FIG. 34;

FIG. 36 is a detail section taken on line 36—36 of FIG. 33;

FIG. 37 shows the chain drive for the stick twirling wheels;

FIGS. 38 to 47 illustrate the box loading mechanism at the front of the machine;

FIG. 38 is a view of the swab machine in front elevation showing the box loading mechanism;

FIG. 39 is a view of the box loading mechanism in side elevation as viewed from the right of FIG. 2 (right side of machine) and in vertical section taken on line 39—39 of FIG. 38;

FIG. 40 is a view similar to FIG. 39 from the opposite side of the machine on line 40—40 of FIG. 38;

FIG. 41 is a horizontal section taken on line 41—41 of FIG. 38;

FIG. 42 is a detail vertical section taken on line 42—42 of FIG. 41;

FIGS. 43–52 illustrate the mechanism for separating a group of swabs to comprise a layer and inserting them in a carton;

FIG. 43 shows the group carrier device in its upward position and is a vertical section taken on line 43—43 of FIG. 38;

FIG. 44 is a similar section showing the carrier device in another position;

FIG. 45 is a similar section showing the carrier in still another position;

FIG. 46 is a similar section showing the depositing position of the carrier device;

FIG. 47 is a vertical transverse section taken on line 47—47 of FIG. 46;

FIG. 48 is a detail vertical section taken on line 48—48 of FIG. 45;

FIG. 49 is a horizontal section taken on line 49—49 of FIG. 48; and

FIGS. 50 to 52 inclusive are detail vertical sections illustrating the actuating mechanism for the parts shown in FIGS. 43–47.

Referring to these drawings, the product of the machine is shown in FIG. 1a and consists of a stick or stem having a rounded and shaped tip of cotton mounted at each end, these tips being secured both by adhesive and by the winding effect of applying a stationary wad or tuft of cotton to each end of the stick while it is rapidly rotated or twirled. The sticks are usually made of wood, although, if desired, they may be made of paper or other appropriate material. These sticks are conventionally from three to four inches in length and the cotton tips project about one-eighth inch beyond the stick so that, with a three inch stick the over-all length of the swabs is about three and a quarter inches. While the machine to be described is intended to make swabs of this size, it will be understood that it may be adjusted or modified to make swabs of any desired length and any size of cotton tip.

General Construction

The machine as a whole is shown on Sheets 1–6 containing FIGS. 1–6, and has a frame 1 consisting of both upright and horizontal steel members of suitable construction and arrangement to support the various parts. A hopper for containing a mass of preformed sticks is shown at 2 (FIG. 3) at the rear of the machine. Two ribbons or slivers of cotton are shown at 3 and 3a, also entering the rear of the machine.

Individual sticks 4 from a mass of sticks 5 contained in hopper 2 are carried to the left in FIG. 3 by means of an endless conveyor. This conveyor comprises two spaced sprocket chains 6 and 6a (FIG. 3a) with devices thereon for supporting each stick adjacent its ends. At a position indicated by numeral 7 the sticks receive adhesive on their sides near both ends and when they reach the left end of the conveyor at the position indicated by numeral 8 the sticks are shifted to a carrier wheel 9. This comprises a pair of spaced sheet metal discs (FIG. 7) having marginal slots 10 therein to receive and support the sticks.

Carrier wheel 9 carries the sticks upwardly to a twirling position 11 where the sticks are sandwiched between two rotating rubber-faced twirling rollers 12 and 13 (FIG. 3). At twirling position 11 the tufts or wads of cotton are advanced and applied to both ends of the stick by mechanism to be described. After the application of the cotton tufts carrier wheel 9 continues to move the sticks forward toward the left, and the swabs, that is, the sticks with the applied tufts of cotton, are delivered as shown in FIG. 4 to a transfer wheel 14 (FIGS. 4 and 7).

Wheel 14, like carrier wheel 9, is composed of two spaced discs having marginal slots 15 therein (FIGS. 7 and 8). While the swabs are on transfer wheel 14 they are tested or gauged by mechanism to be described and any stick which does not have complete cotton tips at both ends is ejected. When the swabs reach the horizontal diameter of transfer wheel 14 indicated at 16 (the in-feed position to the box packing mechanism) they are removed therefrom and placed in individual grooves 18 of an accumulator wheel 17 (FIG. 4). This wheel is also composed of two spaced discs of larger diameter than the carrier and transfer wheels. Accumulator wheel 17 forms a part of a box-packing mechanism and illustrated more especially in FIGS. 38—52. By this mechanism the swabs are separated into groups to form layers and are deposited in rectangular open top cartons 19 (FIG. 41). After the covers (not shown) are placed on these cartons they are ready for further processing.

Completing the outline of the general construction of the machine, the mechanism for measuring and separating equal lengths of cotton from the ribbons 3 and 3a to form tufts is illustrated in FIGS. 11–23a and mechanism is also provided for receiving the successively formed tufts of cotton from the tuft-forming mechanism and applying it to the ends of the stick which is being twirled at position 11. This mechanism is illustrated in detail at FIGS. 24–32.

Drive

The machine is operated by an electric motor 20 which drives a shaft 21 through an endless belt 22 (FIGS. 1, 2, and 11). Shaft 21 drives a parallel shaft 23 through a pinion 24 and gear 25, and through a gear 26 meshing with gear 25, the main shaft 27 of the machine is continuously rotated. These three shafts extend crosswise between the left and right sides of the machine as viewed in FIG. 1 and are suitably journalled in the machine frame. The various mechanisms, such as the tuft-forming mechanism, the tuft-transfer mechanism and the box-loading mechanism are driven by operative connections with one or another of these three shafts.

Shafts 28 and 29 on which the respective lower and upper twirling rollers 12 and 13 are fixed, are rotated by an endless chain 30 shown in detail in FIG. 37 and also seen in FIGS. 1, 2, 6 and 11. As shown in FIG. 6 these shafts include universal joints or driving connections, one purpose of which is to permit the upper shaft 29 to be raised and lowered as will appear later on. In FIG. 37 chain 30 is seen as being driven from a sprocket 31 on shaft 27 and being trained over sprockets 32 and 33 on shafts 28 and 29 respectively, and also over a number of idler sprockets which are required in order to clear other parts of the machine mechanism. A take-up sprocket 34 is provided in order to keep this chain taut.

A common transverse shaft 35 (FIG. 11) extends crosswise of the machine for operating the two tuft-forming mechanisms, one on each side of the machine. This shaft is chain-driven from a sprocket 36 on shaft 23 by a chain 37 which passes over a sprocket 38 on shaft 35, both of these sprockets being shown in dotted lines in FIG. 11.

The endless conveyor comprising the two parallel endless chains 6 and 6a (FIG. 3) which carries the sticks to carrier wheel 9 is driven by a short shaft 39. This shaft is located between the two tuft-forming mechanisms and shown in dotted lines in FIG. 11, this shaft being rotated by a short endless chain 40 trained around sprockets on shaft 35 and shaft 39 respectively. Portions of each of these chains 6 and 6a are visible in FIG. 1.

These two chains pass over pairs of sprockets on a cross-shaft 41 located beneath the hopper 2 and similar pairs of sprockets on shaft 42 (FIG. 3) located at the same level as shaft 41 and adjacent to carrier wheel 9. This is a short shaft not visible except in FIG. 3. The two chains 6 and 6a then pass a pair of idler sprockets 43 and thence downwardly to a pair of driving sprockets on driving shaft 39, referred to above, and thence to a pair of take-up sprockets on shaft 44 located approximately beneath shaft 41.

*Progress of Sticks From Hopper to the Gauging or Testing Position*

The bottom of hopper 2 is formed of two flat walls projecting downwardly at different angles and leaving a discharge space between them (FIG. 3). A sheet metal apron 45 curves downwardly from the lower end of the upper bottom wall and rests against the surface of a constantly rotating cylindrical brush 46. The sticks rest on the lower downwardly sloping wall and are carried thereby against the surface of a slotted and continuously rotating discharge cylinder 47. The brush 46 rotates in the direction of the arrow and keeps the sticks agitated so that they are picked up individually by the successive slots 48 in cylinder 47.

This cylinder and brush 46 are rotated in the directions of the arrows from shaft 41 by gearing (not shown). Cylinder 41 carries the sticks into contact with an arcuate surface 49 which, as the sticks approach the bottom of cylinder 47 serves to support the sticks and allow them to fall by gravity onto forked supports 50 which are mounted in pairs on the conveyor chains 6 and 6a. Forks 50 are mounted upon alternate links of each chain and arranged in pairs, the forks of each pair being maintained by the chains in alignment with one another.

As each stick 4 reaches the adhesive-applying position 7 (FIG. 3) the central portion of the moving stick is engaged by the lower surface of a stationary plate 51, whose surface is roughened or provided with a friction material which causes the stick to rotate. The lower surfaces of the stick at its opposite ends engage each a narrow roller 52, the lower portion of which dips into a body of adhesive 53 which is maintained in a suitable receptacle 54. The two rollers 52 are also rotated from shaft 41 by means of suitable gearing, the intermediate idler gear 55 being the only gear shown. In this way a thin coating of adhesive is applied to the stick for a distance of about one-half inch surrounding each end.

The shifting of the sticks 4 at position 8 from the conveyor 6 to the carrier wheel 9 is accomplished by means of a reciprocating plunger 56 (FIG. 3). This plunger slides back and forth horizontally on shaft 42, and to maintain the plunger in position on the shaft the plunger is slotted as shown. The advance of the plunger to the left to shift one of the sticks 4 into a pair of the slots 10 of the carrier wheel, takes place as each pair of forked supports 50 rounds the sprockets on shaft 42 and reaches an angle of approximately 30° to the horizontal where the lower surfaces of the forks are approximately horizontal and in alignment with the lower edges of the pairs of slots 10 so that plunger 56 can readily push the stick from the conveyor to the carrier wheel.

Plunger 56 is actuated by means of a four-lobed cam 57 on rotating shaft 39, this cam operating an upright lever 58 which is pivoted at 59 to the machine frame 1 (plate 63) and to which plunger 56 is pivotally connected at its upper end. The retracting of the plunger is by a tension coil spring 60 connected to lever 58 which maintains this lever in engagement with cam 57. Rotation of cam 57 is timed with the step or indexing movement of carrier wheel 9, as will be described presently.

Transfer wheel 14 is fixed to a horizontal transverse shaft 61 (FIGS. 4 and 9). This shaft is supported for rotation in two bracket members 62 and 62a. These brackets are mounted on the upper outer corners of two parallel steel plates or castings 63 and 63a forming part of frame 1. Bracket members 62 and 62a have inwardly projecting bearing lugs 64 and 64a (FIG. 8) which constitute the bearings for shaft 61, and also have vertical extensions which serve as supports for other parts of the machine to be described later.

The two discs 9 and 9a which constitute the carrier wheel are constructed and individually mounted for rotation as shown in FIG. 8a on the respective opposite sides of the lower twirling wheel 12. The discs are rotated together at the same speed by gearing. For this purpose discs 9 and 9a are mounted by rivets, or otherwise, on flanged hubs 65 and 65a which project inwardly from two gears 66 and 66a. The hubs of these gears turn on sleeve-like projections forming parts of brackets 67 and 67a which are secured by screws (not shown) on the upper surfaces of the two frame plates 63 and 63a. Brackets 67 and 67a and their sleeve-like projections are bored to receive shaft 28 which supports and drives the lower rubber faced twirling wheel 12.

Gears 66 and 66a are of the same diameter and number of teeth and mesh with two gears 68 and 68a both of which are fixed to a short horizontal shaft 69 which is mounted for rotation in bearings in the two frame plates 63 and 63a. On the end of shaft 69 at the left side of the machine (which is at the left as viewed in FIGS. 5 and 8a) there is fixed index gear 70 of the pin type. Hence, the rotation of this index gear and shaft 69 causes the two carrier discs 9 and 9a to rotate simultaneously as one wheel.

Both carrier wheel 9 and transfer wheel 14 (FIG. 9) are operated by an index or step-drive mechanism shown in FIGS. 5 and 9. This is a cam (or worm) and pin gear mechanism. The pins which project from the side of pin gear 70 are engaged and operated by a worm gear or cam 71 which is fixed to a short vertical shaft 72 (FIGS. 8a and 9) having its bearing in a bracket 72x. The construction of cam 71 is such that pin gear 70 is advanced one pin for each revolution of shaft 72.

Mounted on shaft 72 above cam 71 is another and similar cam 73 which operates a second pin gear 74, this gear being fixed to the outer end of shaft 61 on which the two discs constituting the transfer wheel 14, are secured. The lower end of vertical shaft 72 is driven by means of bevel gearing 75 from horizontal shaft 27.

It will be understood that the pin and worm gearing, just described, is so arranged that for each revolution of shaft 72 both the carrier wheel 9 (carrier discs 9 and 9a) and transfer wheel 14, will be advanced by the angular separation of their respective slots (slots 10 of the carrier wheel and 15 of the transfer wheel). Also because of the drive of the shaft 39 which actuates plunger 56, previously described, this plunger will be operated in timed relation to the step advance of the carrier and transfer wheels.

With the arrangement described it will be understood that after two successive step or index movements of these wheels the stick 4 which is being received on the carrier wheel 9 at position 8 (FIGS. 3 and 9) will reach the twirling position 11 where the tufts of cotton are applied to it. Also after one further step movement this stick (now a swab) will be delivered to transfer wheel 14, as shown in FIG. 4. Upon one further step movement the stick will reach the gauging point 108 which is at the top of transfer wheel 14, and after two additional step movements the same swab 4 will be delivered to the position on the horizontal axis of wheel 14 where the swab is shifted to the accumulator wheel 17, as by the mechanism of FIG. 4 and which will be described later on.

In order to permit the entrance of the stick to the twirling position 11 it is necessary to separate the two rubber faced twirling rollers 12 and 13. This is accomplished by raising upper roller 13 slightly during the movement of the stick to twirling position by the two carrier discs 9 and 9a, as just described. To mount the upper roller 13 for such vertical lifting movement, its shaft 29 has bearings at the outer end of a two-armed bracket 76 which is fixed to a horizontal rock shaft 77 (FIGS. 6 and 10); also shaft 29 includes the universal driving connection shown in FIG. 6 which permits the limited vertical movement.

Figure 10:
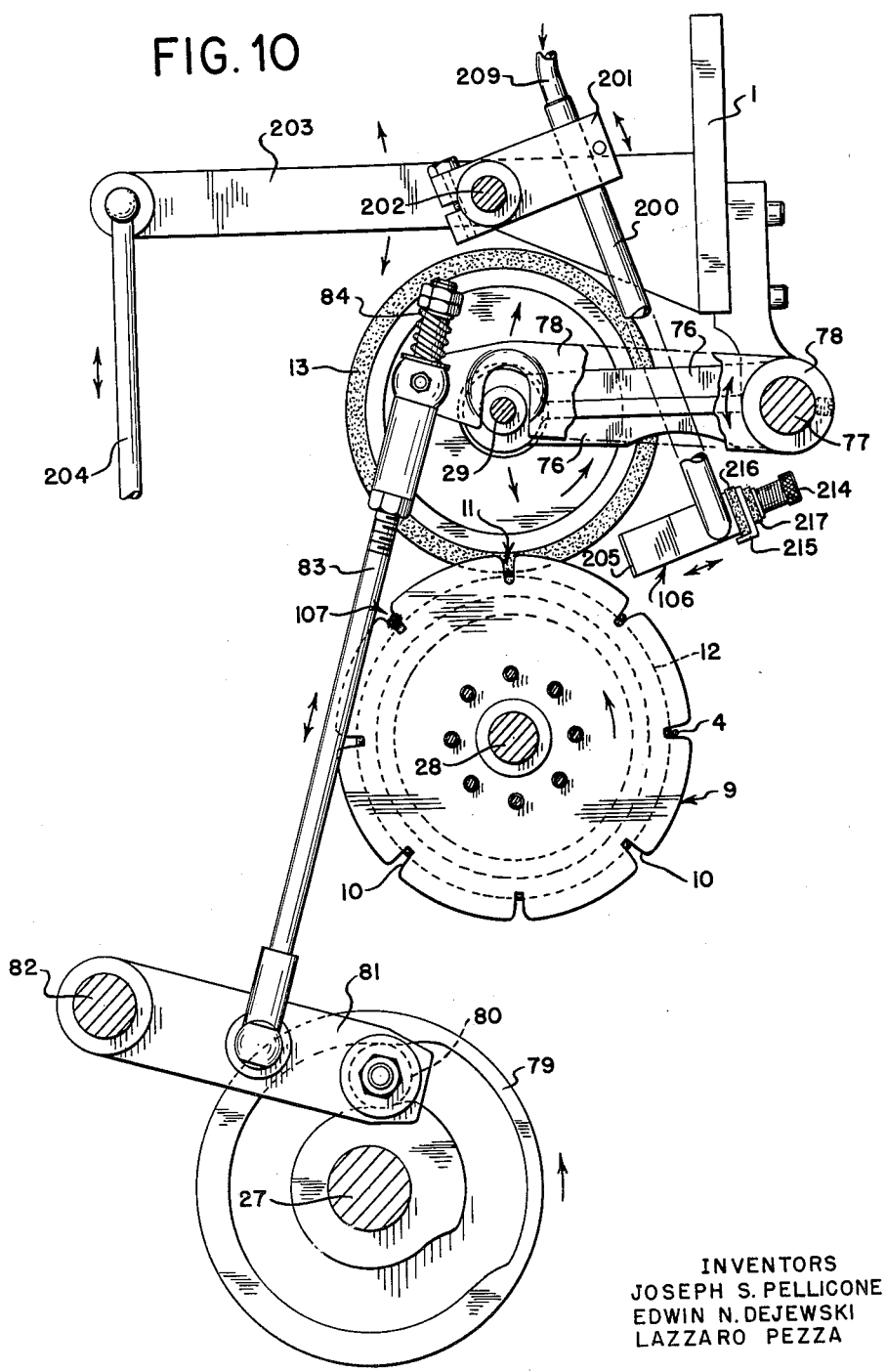
FIG. 10 is a vertical section taken approximately in the plane indicated by the arrows 10—10 in FIG. 6 with parts omitted.

At the outer end of shaft 77, as viewed in FIG. 6 an actuating arm 78 is secured. This arm is raised and lowered periodically by the mechanism shown in FIG. 10. This mechanism includes a face cam 79 mounted on shaft 27, a cam follower roller 80 mounted at the end of lever 81 which is pivoted on a stationary rod 82 extending crosswise between the side frames of the machine (FIGS. 6, 10 and 38). Lever 81 is connected with the outer end of actuating arm 78 by means of an adjustable connecting rod 83 which has a combined pivot and coil spring connection 84 at its upper end with arm 78. By means of this spring connection the two rubber-faced rollers 12 and 13 are brought into yieldable engagement with the stick 4 which is at twirling position 11.

*Forming the Cotton Tufts, Shaping and Applying Them to the Sticks at the Twirling Position and Shaping the Tips*

The general operation of producing uniform lengths of cotton, forming them into tufts and applying them to the twirling sticks will first be described and thereafter the detailed construction of the mechanisms involved will be discussed.

A tuft-forming and feeding mechanism and a tuft-applying or transfer mechanism cooperating therewith to shape and apply the tufts are provided on both the left and right sides of the machine so as to simultaneously apply cotton tufts to both ends of the stick 4 which is at the twirling position 11. It is intended to describe one only of each of these mechanisms, although the drawings illustrate parts of the mechanisms on both sides of the machine.

Referring to FIGS. 11–23a, which show the mechanism for the right side of the machine, the tuft-forming mechanism is contained in a casing or housing which is indicated generally by numeral 85 including both an upper extension and a lower section to be referred to later on. Taken together these three sections comprise an elongated device which is mounted on frame 1 of the machine in such a way as to extend at an angle of 45° to the horizontal, as shown in FIG. 11. The tuft-forming mechanism on the opposite side of the machine is similar in all respects except that it is made for the left-hand side of the machine.

The principal elements of the tuft-forming mechanism are a pair of stationary jaws 88, a pair of movable jaws 89 and a funnel member 90 (FIG. 12). Stationary jaws 88 are arranged for parallel opening and closing, but have no other movement. They are shown closed in FIG. 12 and in open position in FIG. 13. Movable jaws 89 also open and close (always parallel), and, in addition, have a sliding or reciprocating movement toward and away from stationary jaws 88. FIG. 12 shows the movable jaws closed and moved away from the stationary jaws, and FIG. 13 shows the movable jaws open and at the opposite end of their sliding stroke close to stationary jaws 88. Funnel member 90 has a reciprocating movement toward and away from the stationary jaws 88 (compare FIGS. 12 and 13).

By the operation of the three elements just referred to successive uniform lengths or tufts of cotton are removed from the end of the silver or ribbon 3 and are presented to a tuft-applying or transfer mechanism shown in FIGS. 24–32. This mechanism comprises a pair of pivoted jaws 92 which open at their ends by simultaneous outward pivotal movement as may be seen in FIGS. 25 and 26 where the jaws are shown respectively in their open and closed positions. These jaws are mounted on a tubular support 93 which is arranged for reciprocating movement in bearings 94 on a bracket member 95 (FIG. 24) secured to the machine frame 1.

The pivoted transfer jaws 92, when in their retracted position (FIGS. 24, 25 and 26), receive a cotton tuft such as that indicated by numeral 96 from the movable jaws 89 of the tuft-forming and feeding mechanism which advance from the position shown in FIG. 24 to a position where these jaws are adjacent and parallel with the transfer jaws 92. At this point a tripping screw 97 which is carried on a bracket 98 secured to the head which carries the movable or feeding jaws 89, engages a trigger or latch 99 and this causes the jaws 92 to snap closed (FIG. 26). The details of this mechanism are to be described later on. Thereupon the transfer or tuft-applying jaws 92 are moved to the right from the position of FIG. 26 and the tuft 96 is brought into engagement with the end of the stick being twirled at position 11.

The manipulation of the tuft 96 and its application to the end of the stick at twirling position 11 is produced by the cooperation of the movable or tuft-feeding jaws 89 and the pivoted transfer or tuft-applying jaws 92 and is shown particularly in FIGS. 29–32. This manipulation results in a particular shaping of the tuft 96 as illustrated especially in these figures.

FIG. 29 shows jaws 89 and 92 as they appear when they are viewed in FIG. 24 from the upper rear of that figure and in a direction at right angles to the jaws. FIG. 30 is a view of the jaws as shown in FIG. 29 looking from below and it will be seen that jaws 89 grasp the tuft 96 at point well to one side of the centre of the tuft and at a point not more than about one-quarter of the length of the tuft from one end (see also FIG. 24). This leaves three-quarters of the tuft projecting from the outer face of jaws 89 so that when these jaws are in the position shown in FIG. 30 where they have moved forward from the position of FIG. 24 and to a point close to the side of jaws 92, the lengthwise centre of tuft 96 will be located substantially at the widthwise centre of jaws 92.

Jaws 89 are provided with flat, thin metal blade members 100 permanently fixed thereto and operating in a common plane. These blades are so mounted that when the jaws are advanced to the delivering position with respect to transfer jaws 92 the blade members are centered between jaws 92 (as shown in FIG. 29) and project somewhat beyond the opposite side thereof, as shown in FIG. 30. The inner edges of blade members 100 are parallel and in the closed position of the jaws are separated sufficiently to accommodate the thickness of the tuft 96.

Figure 27:
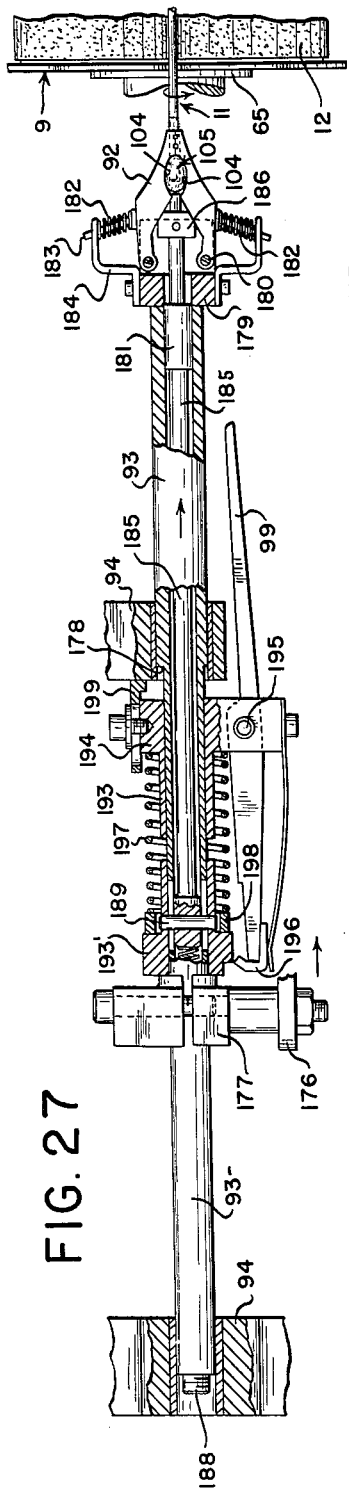
Figure 28:
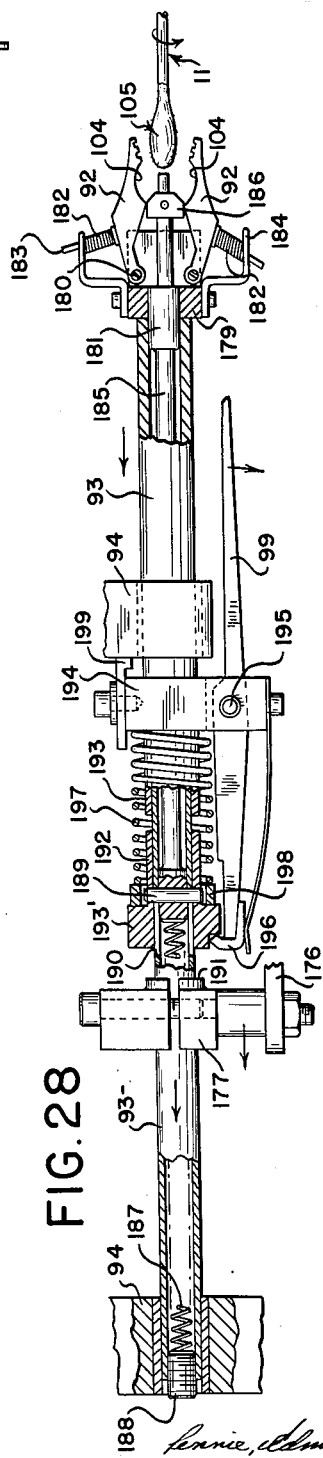

The location of the bight of jaws 89 is to the left of the ends of transfer jaws 92 when they are closed. Consequently as these jaws close on the tuft 96 they cause the tuft to be folded around the straight inner edge of the blade 100 which is on the outer jaw 89 (FIGS. 29–32). This produces a crease 101 lengthwise of tuft 96 and it also causes the central portion of the tuft to be projected forwardedly on each side of this crease forming two rounded folds as shown at 102. This shapes the tuft in such a manner as to cause the engagement of the end of the stick at twirling position 11 with the fibres which are disposed within the interior of the tuft and enables the two curved folds 102 to embrace the sides of the stick as the jaws 92 carry the tuft forward as indicated by the arrow in FIG. 32 and as also indicated in FIGS. 26–28. It will be understood that prior to this advance of jaws 92 the tuft-forming jaws 89 will have receded to to the position shown in FIG. 32.

In FIG. 27 jaws 92 have pushed the tuft of cotton onto the twirling stick and are producing a preliminary forming or shaping action on the cotton tip. This action is brought about by the longitudinal grooves 103 on the inside surfaces of these jaws (FIGS. 24 and 31) and the curved recesses 104 transverse to the inner faces of jaws 92 at the inner ends of grooves 103. In FIG. 28 jaws 92 have re-opened leaving the cotton tip 105 on the twirling stick. Following this pre-shaping of the tip, a shaper 106, shown in FIGS. 5, 6 and 10 and in detail in FIGS. 33–36, is moved against the side of the pre-shaped tip 105 in order to impart the final shaping. The tips on both ends of the stick have been shaped, since a similar shaper 106a (FIG. 5) operates on the opposite side of the machine.

This completes the formation of the cotton tips on the stick at twirling position 11, and the indexing or step motion mechanism previously described (FIG. 9) now operates to advance this stick to the next position 107 (FIG. 4) and to bring up the next stick to the twirling position. At position 107 the stick is received by the transfer wheel 14, and on the next step movement of carrier wheel 9 and transfer wheel 14 this stick will be moved upwardly to the gauging position previously touched upon and which is indicated at 108 in FIGS. 4, 7, 8 and 9. After this the stick continues to move forward with each step movement of the carrier and transfer wheels, and is either rejected in a manner to be described (if defective) or moved onto the accumulator wheel 17 of the packing mechanism.

*Details of Cotton-Measuring and Tuft-Forming Mechanism*

This mechanism is shown in FIGS. 12–23a. We have previously mentioned the casing 85, the pair of stationary jaws 88, the pair of movable jaws 89 and the funnel member 90. Both pairs of jaws open and close and jaws 89 are also mounted for reciprocation and thus are referred to as movable.

Starting with the cotton sliver or ribbon 3 fed by hand through the funnel 90 and between the stationary jaws 88, as shown in FIG. 12, and with both pairs of jaws 88 and 89 closed, a measured length of cotton constituting a tuft has just been transferred to the pivoted jaws 92 of the tuft transfer or applying mechanism, and jaws 89 are to be retracted from their extended position (FIG. 12) and shown in dotted lines in FIG. 32 to their retracted position shown in full lines in that figure and also shown in FIG. 13. Simultaneously with this retraction the funnel 90 has moved upward in FIG. 13 a like distance, and jaws 89 and the tip of funnel 90 are now both in close proximity to, but slightly spaced from the opposite sides of stationary jaws 88.

Just prior to the commencement of such movement jaws 88 were opened to the position of FIG. 13, and the portion 109 of the cotton projecting from funnel 90 has been advanced until the end thereof extends a measured or predetermined distance beyond the surface of movable jaws 89. The distance which cotton portion 109 extends beyond these jaws determines the length of the tuft which is to be formed, and can be varied by changing the reciprocating strokes of jaws 89 and funnel 90 which can be accomplished by the mechanism to be described later on.

This forward feeding movement of the cotton ribbon 3 is produced by the pinching of the ribbon between the back of funnel 90 and a resilient or plate spring finger 110 which is secured to the front of funnel 90 and bent inwardly to produce a restricted area at the discharge end of the funnel.

Upon the advance of the cotton portion 109 to the position of FIG. 13 the pairs of jaws 88 and 89 both close substantially simultaneously and exert a forceful clamping action upon the cotton, both pairs of jaws being provided with the rib and groove formation shown in FIG. 30. Upon the closing of the jaws, movable jaws 89 and funnel 90 simultaneously commence their return movement and during this movement the separation of movable jaws 89 from jaws 88 pulls the portion 109 of the cotton into two parts, the main portion being carried forward by jaws 89 and forming tuft 96 (FIG. 14) to be presented to the pivoted jaws 92 of the transfer mechanism. Short portions are left projecting from both jaws 88 and 89.

The forward movement of jaws 89 carries the cotton portion 109 in edgewise position between jaws 92 as previously described in connection with FIGS. 29 and 30 and as also shown in FIGS. 14, 15 and 18. During the the backward movement of funnel 90 the narrow end of the funnel with its flexible resilient finger 110 slides over the cotton forming a successive measured length 111, and since the upper end of this cotton is firmly held by jaws 88 the pinching action of the funnel tends to produce a straightening of the fibres in the cotton portion 111 and also serves to compact and flatten out the cotton in this portion.

This completes the cycle of operation of the cotton measuring and tuft-forming jaws and it will be understood that upon the next upward movement of funnel 90 which takes place as soon as jaws 88 re-open, the new measured length of cotton will be advanced to the position occupied by the previous measured length 109 of FIG. 13.

Both the stationary jaws 88 and the movable jaws 89 are L-shaped members as may be seen in FIGS. 22 and 23a. The stationary jaws 88 have shank portions 112 and movable jaws 89 shank portions 113. The jaws 88 are mounted in a stationary jaw head 114 and jaws 89 in a movable jaw head 115 (FIG. 12). These two jaw heads are mounted side-by-side at the end of an upward extension in casing 85 which, viewed from the side as in FIG. 12, is considerably narrower than the central portion of the casing.

Stationary jaw head 114 has a square shank 116 which is fixed in the outer wall of the casing extension (FIG. 15), and the jaw head extends laterally in a horizontal position crosswise, although the jaws are tipped at an angle of 45° in view of the arrangement of casing 85 in the position shown in FIG. 11 and as previously mentioned. Relative to the swab machine as a whole, jaw head 114 is in a lower or inner position from the jaw head 115.

Jaw head 114 is rectangular in shape (FIG. 23a) and has a cap 117 secured in place by screws 118. The shanks 112 of the stationary jaws 88 slide in contact with one another on the inside and, on the outside, on the opposite walls 119 of a recess on the interior of cap 117.

The jaws are moved from closed to open position and vice versa by means of an actuating rod or shaft 120 to which an oscillating movement is parted by mechanism to be described. This rod rotates in shank 116 and its outer end terminates in a somewhat enlarged head having two driving pins 121 projecting therefrom. These two pins are received in angularly transverse slots 122 cut respectively in the two jaw shanks 112. Consequently a rocking or oscillating movement of rod 120 and these two pins 121 will cause the simultaneous movement of shanks 112 in opposite directions to either open or close jaws 88. The inside line of contact of shanks 112 lies in a plane passing through the axis of rod 120 (FIG. 23a) so that both jaws have equal movement.

It will be understood that the shanks 113 of the movable jaws 89 (FIG. 22) are mounted in a similar manner for sliding movement in jaw head 115 and are actuated from open to closed position, and vice versa, by a pin and slot construction like that just described in connection with FIGS. 22, 23 and 23a.

In order to provide for the movement of jaws 89 back and forth with respect to stationary jaws 88, the shank 123 of jaw head 115 is elongated and mounted for sliding movement in a square sleeve 124, shank 123 itself being square in cross-section and closely fitting the square internal aperture of sleeve 124 so as to hold the jaws 89 firmly against rocking movement. The actuating rod or shaft 125 for movable jaws 89 is mounted for rotation centrally in shank 123 and together with actuating shaft 120 for stationary jaws 88, extends throughout the interior of casing 85, the opposite ends of these rods being received in bearing apertures in the lower or outer wall of casing 85 (FIGS. 15 and 18).

Also mounted for sliding movement in an aperture in rear wall 126 is a funnel supporting rod 127 which at its opposite end carries funnel 90. All three rods 120, 125 and 127 are parallel with one another, and funnel rod 127 extends through an aperture in the front wall 128 of casing 85 (FIGS. 15 and 22). In front of front wall 128, the funnel rod 127 is bent at right angles and extends first inwardly and then upwardly as viewed in FIGS. 15 and 22 so as to support funnel 90 in longitudinal alignment with the stationary and movable jaws 88 and 89 (FIGS. 12–15).

The rocking or oscillating movements of rods 120 and 125 and the longitudinal reciprocating movements of rods 125 and 127 are brought about by means of a cam member 129 (FIGS. 15 and 18) which is fixed to a continuously rotating cam shaft 130 mounted in parallel relation to rods 120, 125 and 127 and rotating in bearings supported respectively by the rear and front walls 126 and 128 of casing 85. Cam shaft 130 extends through wall 126 into the approximately rectangular casing section 131 which is formed integrally with the lower end of casing 85. Casing section 131 contains gearing by which the cam shaft 130 is driven. The drive is from shaft 35 which extends through the opposite side wall of casing section 131 and which is connected to cam shaft 130 by means of bevel gearing 132 and a train 133 of spur gearing.

Cam 129 on cam shaft 130 has two cam tracks, a drum cam track 134 (FIG. 19) and a face cam track 135 (FIG. 21) the former causes the back and forth sliding movement of the movable jaws 89 and the funnel 90, and the latter causes the opening and closing movement of both movable jaws 89 and stationary jaws 88.

Referring to FIG. 17 a cam follower roller 136 operates within the drum cam track 134, this roller being mounted on a double armed lever having an upper arm 137 and a lower arm 138 (FIGS. 17 and 19). This double armed lever is pivoted at its centre on a pin 139 which projects inwardly from a cover member 140 which is mounted on the outer face of casing 85 (FIG. 12). The upper actuating rod 125 for the movable jaw head 115 and jaws 89 is reciprocated by an arm 141 (FIG. 17) which has an aperture at its right end through which rod 125 passes, and which is arranged for sliding movement on a stationary guide rod 142.

Guide 142 is fixed at its opposite ends in the walls 126 and 128 of casing 85 (FIG. 18). Arm 141 at its apertured right end is closely engaged on either side by collars 141a (FIG. 15) which are fixed to rod 125 and by which the motion of the arm 141 is communicated to the rod. Arm 141 has an extension on the left side of guide rod 142 as viewed in FIG. 17 containing a vertical slot 143 with which a roller 144 cooperates, this roller being mounted on a pin projecting from the upper arm 137 of the double arm lever.

The funnel operating rod 127 is reciprocated in a somewhat similar manner by an arm 145 (FIG. 17) fixed at its right end to rod 127 and arranged for sliding movement on a second guide rod 146 which is parallel with guide rod 142 and also secured at its opposite ends in the walls 126 and 128. An extension of arm 145 at the left of guide rod 146 has a vertical slot 147 within which operates a roller 148 mounted on the lower arm 138 of the double armed lever.

It will be understood from this construction that the longitudinal movements of the respective actuator rods 125 and 127 occur simultaneously and in opposite directions. The length of the stroke of the rod 125 is fixed because movable head 115 and jaws 89 have a fixed stroke determined by their position shown in FIG. 13 adjacent stationary jaws 88 and their position adjacent the pivoted transfer jaws 92 shown, for example, in FIGS. 29–32.

The stroke of the funnel 90, however, is made variable in order to change the length or size of the cotton tuft 96 when it is desired to do so. This change in the length of the stroke of actuating rod 127 is accomplished by means of a shiftable mounting for the roller 148 which is shown in FIGS. 17 and 19a). Pin 149 on which roller 148 turns passes through an elongated slot 150 formed in the lower arm 138 of the two-armed lever. A special washer 151 having a pair of diametrically opposed teeth 152 is arranged to be shifted along a series of teeth 153 on the face of the arm 138. The parts are held in place by a nut 154.

The oscillating movement of rods 120 and 125 for the purpose of opening and closing the stationary and movable jaws 88 and 89 originates in the face cam track 135 of cam 129 (FIGS. 20 and 21). This cam track through its cam follower roller 155 imparts a rocking movement to a lever 156 which is disposed adjacent the upper end of cam 129 (FIGS. 18 and 21) and from the surface of which cam follower 155 projects. Lever 156 pivots on a stud 157 which is secured in and projects from vertical wall 128 on casing 85 (FIG. 17), this stud being located close to actuating rod 120. Lever 156 rocks back and forth in contact with the inner face of cam 129 (FIG. 18), and on the opposite side of lever 156 in contact therewith, there is a spur gear 158. This gear is mounted for free rotation on cam shaft 130.

The rocking of lever 156 is communicated to gear 158 and causes the gear to oscillate. For this purpose the two parts are connected by a pin 159 received in an aperture in the web of gear 158 and which has an integral base 160 which is square, as may be seen in FIG. 21, and is arranged for sliding movement between two spaced guides 161 which project from a circular plate 162, this plate being secured in position in a recess in the outer end of lever 156. This allows for the slight relative radial movement of connecting pin 159 with respect to lever 156.

The oscillating movement of gear 158 is utilized to produce simultaneous oscillation of actuator rods 120 and 125 to open and close their respective jaws 88 and 89 and this movement is transmitted to them in such a way as to maintain the jaws under resilient clamping pressure against the cotton held by the respective jaws.

To accomplish this result an elongated pinion sector 163 (FIGS. 15 and 16) is arranged to be free to turn on rod 120 and a similar elongated gear sector 164 is similarly mounted on rod 125. Gear sector 164 is arranged to have its teeth mesh directly with the oscillating gear 158 but because of the opposite rotation of rod 120 the teeth of gear 158 drive the teeth of gear sector 163 through an idler gear 165 (FIGS. 17 and 20) which is arranged to turn on stud 157 alongside of lever 156. Gear sector 164 is elongated in order that it may remain in mesh with gear 158 throughout its reciprocating or sliding movement. Gear sector 163 need not be elongated because shaft 120 does not reciprocate, but is made a duplicate of gear sector 164 in order that the parts may be alike.

Adjacent the upper end of gear sector 163 there is a coupling member 166 (FIG. 16) which is fixed to shaft 120, and gear sector 163 has a single tooth 167 projecting from its end into an arcuate slot 168 in coupling 166 (FIG. 15). These parts are held in engagement by means of a collar 169 fixed to rod 120 at the lower end of sector 163. The sector and coupling members are interconnected by means of a coil spring surrounding rod 120 and the opposite ends of which are engaged, one with sector 163 and the other with coupling 166. The actuation of rod 125 by gear sector 164 is identical with the arrangement just described for actuating rod 120 and the description will not be repeated.

When gear 158 is oscillated in a direction to close the respective pairs of jaws 88 and 89, the coil springs 170 between the respective elongated gear sectors and their coupling members 166 are first placed under tension and bring about the closing of the jaws. The oscillating movement of gear 158 is made slightly greater than necessary to accomplish the opening and closing movement of the jaws, such over-travel being taken up by the coil spring 170. This insures an adequate grip on the cotton by both sets of jaws. During the opening movement of the jaws the single tooth 167 of each of the pinion sectors 163 and 164 may engage the end of the slot 168 within which it operates in coupling member 166 to produce a positive jaw opening.

*Details of the Tuft-Applying or Transfer Mechanism*

This mechanism receives the cotton tufts from the tuft-forming mechanism and moves them up to and places them on the end of the twirling stick at twirling position 11. The mechanism is shown in FIGS. 24–28.

As previously mentioned this mechanism includes a tubular supporting member or transfer assembly 93 of considerable length and arranged to slide in bearings 94 that are a part of a bracket 95 which is bolted to the frame 1 of the machine. Tubular support 93 carries the pivoted jaws 92 at its right or inner end, which jaws place a cotton tuft on the end of the twirling stick and impart a preliminary shaping to the cotton tip 105, as previously referred to.

Mechanism, as shown in FIGS. 24–28, is mounted on each side of the machine and the tubular assemblies 93 are reciprocated simultaneously to simultaneously apply cotton tufts to the opposite ends of the stick being twirled at position 11. The reciprocating movement of the tubular members 93 is produced by means of cams 171 and mounted on each side of the machine on the opposite ends of continuously rotating shaft 27, only one of these cams being shown (FIGS. 1, 2, 6, 11 and 24).

Cam 171 is of the drum type and actuates a cam follower roller 172 (FIGS. 11 and 24) which is mounted at the lower end of a lever 173 pivoted at 174 on a bracket 175 bolted to the machine frame. The upper arm of lever 173 actuates tubular support 93 through a short connecting rod 176 which is pivoted to the upper end of the lever and also to the fitting 177 which is clamped to the tubular support 93. The pivotal connection of this connecting rod with lever 173 is radially adjustable, as illustrated in FIG. 24, for the purpose of varying somewhat the length of stroke of member 93 so as to be able to control the approach of jaws 92 to the end of the twirling stick at position 11.

The mechanism associated with tubular support 93 for mounting and controlling the opening and closing of the pivoted jaws 92 is shown in FIGS. 25–28. Tubular support 93 is divided into two sections by a shoulder, the section at the left of this shoulder being of small diameter and indicated by numeral 93–. The pivoted jaws 92 are mounted on a block 179, their rear portions being received in recesses in this block of a width to closely fit the sides of the jaws, and their rear ends are pivoted within these recesses on pivot pins 180. Block 179 is fixed to the end of tubular member 93.

Jaws 92 are urged towards closed position by means of coil springs 182 which are mounted on stems 183 projecting outwardly from the respective jaws. These stems pass loosely through apertures in L-shaped fingers 184 secured to block 179. The jaws are opened and closed by means of a longitudinally shiftable rod 185 having a cam-shaped head 186 at its right end to engage the inner surfaces of jaws 92. By longitudinal movement from the position shown in FIG. 25 to that shown in FIG. 26, the jaws are allowed to close under the action of springs 182, and vice versa, movement of the rod in the opposite direction serves to open the jaws.

The outer end of rod 185 serves to limit the lengthwise expansion of the cotton tip and cooperates with curved surfaces 104 of the jaws in the preliminary shaping operation.

The control rod 185 has a cylindrical enlargement 181 at its right end and a similar enlargement 186' at its left end. These enlargements support the control rod in sliding relation to the bore of the tubular support 93. An elongated compression coil spring 187 (FIG. 25) tends to force rod 185 to the right to open jaws 92, this spring being disposed within section 93– of the tubular support and extending from enlargement 186 to the left end of the tube where it is held in place by a screw plug 188. The movement of rod 185 to the right under the force of spring 187 is stopped by the engagement of a cross-pin 189 which is positioned in an aperture in enlargement 186 and the end portions of which extend through a lengthwise slot 190 in the tubular support, the right end of this slot stopping the pin.

Between shoulder 178, previously mentioned, which divides the larger and smaller portions of tubular support 93 and the end of a circular boss 191 on fitting 177 are mounted two somewhat similar sleeves 192 and 193 which are arranged for free sliding movement on the outer section of tubular section 93–. Sleeve 192 has a cylindrical head 193' which is integral with its left end, and integral with sleeve 193 at its right end there is a block 194.

On the lower portion of block 194 the latch or trigger member 99 is pivoted at 195, and at its left end this member is provided with a hook-shaped latch portion 196 which is arranged to engage a recess in the lower left side of head 193' as will be presently described. Surrounding the two sleeves 192 and 193 there is a compression coil spring 197, one end of which bears against block 194, and the left end of which bears against a ring 198 which, in turn, is held against the cylindrical head 193'. To permit ready disassembly, ring 198 may be slid to the right with the fingers, compressing spring 197 so as to release pin 189 so that it may be removed.

The force of spring 197 transmitted through sleeve 192 and pin 189 to rod 185 tends to shift this rod to the left and thus permit the pivoted fingers 192 to close, spring 197 being stronger than spring 187. As shown in FIG. 25, rod 185 has been shifted to the right compressing spring 197 and opening jaws 92, and the parts are held in this cocked position by means of the trigger or latch 99.

In this cocked position a cotton tuft 96 is advanced by movable jaws 89 as shown in FIG. 24 as these jaws approach pivoted jaws 92 from the side. After the tuft 96 is within the open jaws 92, as previously described, screw 97 engages trigger 99 and swings it about its pivot so as to release latch 196 from the head 193' (FIG. 26). This allows jaws 92 to snap closed on the cotton tuft as described just above. During this operation, head 193' is moved against boss 191 which serves as a stop, and pin 189 slides to the left along slot 190.

The next operation is the movement of the pivoted jaws 92 to the right by operating lever 173 and cam 171

(FIG. 24). In FIG. 27 the cotton tuft 96 has been applied to the end of the stick at twirling position 11 and the preshaping of the tuft is taking place, but the movement of the jaws under the action of cam 171 is not yet quite complete. At this point an adjustable stop 199 mounted on block 194 has engaged the side of the right-hand bearing 94. This arrests the forward movement of the block and trigger latch 99, 196, and during the continuing final movement of the jaws to the right causes coil spring 197 to be compressed until latch 196 returns into engagement with the notch at the lower side of the rounded head 193' at the left of the second sleeve 192. Jaws 92, however, are still closed as in FIG. 27.

The transfer assembly 93 now begins its return movement towards the left. During the first part of this movement spring 187 holds control rod 185 in its forward position towards the right so that cam head 186 is held stationary. The movement of transfer assembly 93 causes jaws 92 to open by riding on the cam head 186. By the time the jaws are fully open the forward or right end of slot 190 contacts pin 189, and from there on carries rod 185 toward the left with the movement of the assembly. The transfer assembly is in fully cocked position and is returned to its initial position at the left as shown in FIGS. 24 and 25, to receive the next succeeding cotton tuft.

Details of Tuft Shaper

This device is illustrated in detail in FIGS. 33–36. There are two of these devices 106 and 106a, as previously referred to, cooperating with the tufts formed on the opposite ends of the stick at twirling position 11 (FIGS. 5, 6, 9 and 10). These are each mounted on the lower end of a hollow tube 200. Tubes 200 and 200a are supported at their upper ends by means of clamps 201 and 201a so as to permit the adjustment of their position with respect to the stick at twirling position. These clamps both engage a rock shaft 202 which extends crosswise of the apparatus and is supported in suitable bearings mounted on the machine frame.

Rock shaft 202 is actuated by an arm 203 (FIG. 10) and a connecting rod 204 from a cam (not shown) in timed relation to the withdrawal of the transfer assembly 93 and pivoted jaws 92 so as to move the shaper 106 laterally against the side of the twirling tip 105 to produce the final shaping following promptly after the preliminary shaping which is produced by the jaws 92 as previously described.

Shaper 106, as may be seen in FIGS. 33–36, is a hollow box-like structure of bronze or other suitable metal. Its operating end is shown in FIGS. 34 and 35 and is formed of a flat piece of sheet metal 205 in the surface of which a recess 206 is pressed or otherwise formed having a depth slightly greater than half the diameter of the cotton tip 105. This recess is contoured to the form which it is desired to impart to the cotton tip as shown in FIGS. 34 and 35, and the bottom of the recess is cut away at one side so as to leave an elongated aperture lengthwise of the tip to expose the surface of a moisture-retaining material 207 such, for example, as synthetic sponge. This slot-like exposure of the sponge is narrowest at the point 208 opposite the region of greatest diameter of the tip 105.

The hollow box-like structure of shaper 106 is constructed to be water-tight, and water is fed into a lateral opening 208 from the hollow tube 200 which is supplied with water from any suitable source through a flexible tube 209 (FIGS. 9 and 10) concented to its upper end.

Suitable light pressure is exerted on the moisture-retaining material 207 by means of a compression coil spring 210 and a light metal plate 211 which is brazed to its outer end (FIG. 35). The opposite end of spring 210 is received on a projection 212 on the inner end of a rod-like handle 213 having a knurled knob 214 at its outer end.

In order to renew the moisture-retaining material 207, the end of the box-like shaper structure 106 opposite to the recess 206 is provided with a removable cover in the form of a metal plate 215. This cover plate is provided with a soft rubber packing 216, and packing 217 is also provided around the stem 213. The cover is releasably held in position by means of a pair of fingers 218 (FIG. 36) which project on opposite sides of stem 213 and which engage the inner surfaces of two shelf-like projections 219 on the interior of the shaper casing. By pressing in on the stem 213 and rotating it slightly, the fingers 218 may be rotated to positions opposite recesses in shelf 219 as shown, whereupon the cover is freed.

Gaging or Testing of Swabs and Infeed to Accumulator Wheel of Packing Mechanism When the swabs are received by the transfer wheel 14 from carrier wheel 9 at position 107 (FIGS. 4, 7 and 8), the swab tips rest on two curved rails 220 and 220a and swab sticks 4 are held laterally by the edges of slots 15. These rails extend somewhat less than 180 degrees to a point just beyond the infeed position 16. They are supported about midway between their ends by integral horizontal projections 221 and 221a (FIGS. 6 and 8) which are fixed to the inside surfaces of brackets 62 and 62a.

Extensions 221 and 221a are located at gaging or testing position 108, and at this point there are interruptions 222 and 222a in the rails 220 and 220a. The width of this interruption is slightly less than the thickness of the cotton tips 105. Hence, when the tips 105 are completely formed on both ends of the stick 4, the swab passes through the gauging position and continues its movement along the rails towards the infeed position 16 at each step movement of the transfer wheel 14. However, should a stick come through without a tip at both ends as indicated at the gauging position 108 in FIG. 8, the stick will drop through the interruptions or apertures 222 and 222a into one of the enlarged circular recesses 223 which are formed in the two spaced discs comprising the transfer wheel 14. Also, should a swab come through with a cotton tip 105 on one end, but no tip at the other as is indicated by the swab at the right in FIG. 8, the end without any tip will drop into the recess 223.

In either case, as the step movement of transfer wheel 14 continues, the swab stick 4 will be carried forward beneath one or both of rails 220 and outwardly of an arcuate wiper plate 224 (FIGS. 4c, 7 and 8) which extends from a point just to the left of gauging position 108 to the bottom of the transfer wheel where it is supported by a shank 225 on the frame of the machine. Wiper plate 224 is so arranged as to allow the incomplete swab to pass beyond the end of rail 220 which is just below the infeed position 16 and then force the stick outwardly and cause it to be ejected at the next index position which is indicated by numeral 225. Thus the arcuate plate 224 cooperating with the inner surface of rails 220 causes ejection of a stick which has a cotton tip at one end only, or at neither end, or of a broken stick which sags downwardly into the space between these members (FIGS. 7 and 8).

Provision is also made for detecting the absence of two successive swabs on the transfer wheel 14 and for stopping the machine in that event. This mechanism includes a rod 227 (FIGS. 4 and 4c) which is mounted for sliding movement in an elongated sleeve-like support 228 and this housing is mounted between two vertical sheet metal guard plates 229. These guard plates extend upwardly from the infeed position 16 about half way around the accumulator wheel 17 and serve to hold the swabs in the grooves 18 thereof (FIGS. 39 and 40). Guard plates 229 also extend to the right of infeed position 16 for something more than one-quarter the circumference of the transfer wheel 14 so as to hold the swabs within the grooves 15 of the transfer wheel during their movement from the gauging position 108 to the infeed position 16. The spaced guard plates 229 are supported at their front portions above the gauging point 108 on a short cross-rod 230 which extends crosswise between the two bracket members 62 and 62a. Guard plates 229 at their highest points are supported on a cross-rod 231 (FIG. 38) which extends between the tops of two vertical arms forming parts of bracket members 232, these bracket members being bolted to the upper sides of the respective frame plates 63 and 63a (FIGS. 2 and 39).

Returning to the description of the swab detector, rod 227 carries at its lower end an arcuate foot 233 (FIG. 4) which is curved upwardly at its forward or right end, but which spans the angular distance between the gauging position 108 and the stick position at the next index movement, or, in other words, the foot member 233 rests upon one or both of the swab sticks at these two positions. Should there be no swabs at either of these two positions foot member 233 and rod 227 will drop downwardly under their own weight and communicate this movement through a lever 234 to a microswitch 235 (FIG. 39) and cause the opening of this switch and the stopping of the main operating motor 20. Microswitch 235 is mounted on a shelf 236 which, as indicated in FIG. 4, is supported by the two guard plates 229.

We now come to the mechanism for feeding the swabs at infeed position 16 into the grooves of the accumulator wheel 17 from the transfer wheel 14. This mechanism is shown in FIGS. 4, 4a, 4b and 4c. This mechanism also causes the index movement or the step-by-step rotation of the accumulator wheel. The infeeding and indexing member of this mechanism is indicated generally by numeral 237. It consists of a head portion 238 having a supporting shank 239 which is mounted on a pivot pin 240 forming part of an infeed assembly indicated generally by numeral 241.

This assembly comprises a block 242 (FIGS. 4 and 4c) which is mounted for rocking movement on the cross-rod 82 and from which an actuating arm 243 projects carrying at its lower end a cam follower roller 244 that operates in the track of a cam 245 which is fixed to rotating shaft 27. Pivot pin 240 for the supporting bar 239 of the infeed member 237 projects from the side of arm 243 in close proximity to one face of block 242.

Head portion 238 of the infeed mechanism has at its upper end two spaced upwardly extending fingers 246 which project upwardly from two narrow ledges 247 (FIG. 4c). The working surfaces of fingers 246 extend at somewhat more than a right angle with respect to the ledges 247 so that as transfer wheel 14, in its step movement advances the swabs to the infeed position 16, the sticks of the swabs are received in the pockets formed by fingers 246 and ledges 247.

In timed relation with the index or step movement of transfer wheel 14 cam 245 causes the infeed member 237 carrying the ledges and fingers just referred to at its upper end to move first to the left and then upwardly to the position shown in FIG. 4a. During this compound movement the swab is carried horizontally as indicated in FIG. 4 into the grooves 18 of the accumulator wheel discs 17 which is at the level of the infeed position 16.

This double movement is brought about first by a swinging to the left of the upper end of index member 237, and when the swab stick 4 reaches the accumulator wheel 17 it arrests further swinging movement and index member 237 commences to turn on its pivot 240 compressing a coil spring 248 which is mounted in a bore in block 242 and which bears against the lower end of bar 239 through a plunger 249. The accompanying rising movement of pivot pin 240 causes the index member 237 to impart an upward step or indexing movement of accumulator 17 through the stick 4 of the swab which has just been fed into this wheel. The relation of the parts at the end of the up-stroke is shown in FIG. 4b where it will be seen that the shank 239 has moved away from the end of an adjustable stop screw 250, by which the position of the head of the index member is adjusted with respect to the infeed position 16 at the commencement of an infeed movement.

It will be understood that inasmuch as the infeed mechanism acts on the accumulator wheel 17 through the swab which is being fed into this wheel, no step movement of the accumulator wheel will take place should there be no swab fed forward by the transfer wheel 14 to the infeed position 16.

*Box Loading Mechanism*

The accumulator wheel 17 consisting of the two discs 17 has a hub 251 (FIG. 47) to which the discs are secured and which is fixed on a horizontal shaft 252 which turns freely in ball bearings as shown in this figure. These bearings are supported by brackets 232 (FIGS. 39 and 40). The accumulator wheel being free to rotate, and being advanced by the reciprocatory movement of the infeeding member 237 (FIG. 4) provided a swab is present to be fed into the wheel, provision is made to maintain the wheel in position after each infeed movement. This is done by means of a ratchet wheel or disc 253 (FIG. 40) whose teeth are engaged by a spring-pressed pawl 254 the mounting for which is attached to the upright arm of one of the brackets 232. Ratchet wheel 253 is fixed to the side of one of the accumulator discs 17.

As the feeding of the swabs at infeed position 16 continues, the accumulator wheel 17 is filled with the swabs for about two-thirds of its circumference. The swabs enter between two end guides 255 (FIGS. 38–40) which are arcuate, semi-circular plates supported in part by the semi-circular guard plates 229 and in part by arms 256 which extend radially from brackets 232 on which they are mounted for angular adjustment. A short horizontal rod 257 extends between the ends of these brackets (FIG. 38) for the purpose of supporting end guides 255. The upper ends of these guides are flared outwardly as shown in FIG. 38 so as to cause the swabs to be shifted into alignment with one another as they enter between them.

A pair of retaining guides 258 constituting extensions of guard plates 229, are pivoted at their upper ends to cross-rod 257 and at their lower ends are engaged by a flat plate spring 259 which is fixed at its upper end to a hood-like support 260 which in turn is supported by cross-rod 257 and by guard members 229. In this way retaining guides 258 are yieldably held against the sticks of the swabs so that a group of the swabs can be shifted radially outward, as will be presently described, in order to remove them from the group in grooves 18 of accumulator wheel 17 and insert them in a box or carton 19 which is at the packing position indicated by numeral 261 on the rotatable carton supporting table 262 (FIG. 41).

In brief, this packing operation is performed by a carrier comb or transport member 263 (FIG. 43) having teeth 264 for engaging the stick portions of the swabs when it is raised to loading position which is the angular position shown in this figure, and projected radially outwardly. During such movement the transport member engages a predetermined number of the swabs in the grooves 18 of the accumulator wheel, pushing them outwardly under the yielding action of the plate spring 259 and freeing them from these grooves. Transport member or carrier comb 263 then swings the group downwardly until the carrier is in vertical position over the carton at filling position 261. It then deposits the group of swabs in the box, immediately thereafter returning to the position shown in FIG. 43 to receive another group of the same number of swabs, which, by this time, have been advanced by the accumulator wheel into position ready to be removed.

The table 262 for supporting the boxes 19 is arranged to receive a predetermined number of boxes, in this instance eight, and to hold them in radial arrangement on its surface. For this purpose table 262 is provided with pockets to hold the cartons in position. Each of these pockets consists of an end stop member 265 for engaging the inner end of the box, and two triangular metal blocks 266 for engaging the opposite sides of the box near the opposite end. The boxes are manually inserted in these pockets by the machine operator. A short plate spring 267 (FIG. 41) engages the outer end of each box as it reaches the filling position 261 so as to hold it in engagement with the end stop 265 at this position.

The drive for the mechanism which rotates table 262 and also actuates the carrier comb 263 and its associated parts, is shown in FIGURES 38–41. This drive is from the shaft 21 that mounts the pulley which is belt-connected to the driving motor 20 (FIG. 1). Through helical gearing 268 (FIGS. 39–41) shaft 21 drives a longitudinal shaft 269. Near the left end of the shaft 269 there is a worm 270 which is rotated by the shaft through a slip drive consisting of friction discs 271 maintained in yielding engagement with each other by a coil spring 272. Worm 270 drives a worm gear 273 which is part of the input side of a one-revolution clutch 274 mounted on a cam shaft 275 and which is arranged to turn this cam shaft only one revolution at a time whenever the clutch-operating mechanism is actuated.

On cam shaft 275 there are three cams for operating the carrier comb 263 and other parts of the packing mechanism, the cams being indicated at 276, 277 and 278. Their connection with the packing mechanism is to be described later. To the left of cam 278 (FIG. 38) there is another set of helical gearing 279 by means of which another longitudinal shaft 280 (FIG. 40) is driven whereever shaft 275 is rotated.

The carton-supporting table 262 is mounted on the upper end of a short vertical shaft 281 (FIG. 39). On the lower end of this shaft there is a worm gear 282 which is driven by a worm 283 near the right end of shaft 280, this worm being driven from shaft 280 through a slip drive 284 consisting of friction discs held in engagement by a coil spring 285.

In order to stop the rotation of table 262 so as to place each of the box pockets on the top thereof accurately at the position 261, the table is provided on its underside with a series of slotted lugs 286, one corresponding to each of the carton pockets. The one-revolution clutch 274 (FIG. 39) is controlled by an electromagnet or solenoid 287 and this solenoid simultaneously operates a vertically shiftable stop rod 288, the upper end of which engages the respective slotted lugs 286 to stop the movement of table 262.

One-revolution clutch 274 has a horizontal control finger 289 which is pivoted at 290 to the machine frame and whose right end (FIG. 39) engages a radial shoulder 291 to stop the rotation of the output side of the clutch and also to cause it to stop always in the same angular position so that the cams 276, 277 and 278 will be ready to initiate a new cycle of operation of the packing mechanism. This control finger 289 is operated by a plunger 292 of the solenoid 287 through a link 293 which is pivoted to both the plunger and to a downward projection on finger 289. Control finger 289 is held in its normal or raised position with its end in engagement with shoulder 291 by means of a tension coil spring 294 one end of which is connected to the machine frame and the other to a tail portion 295 of finger 289 at the left of pivot 290.

Momentary energization of solenoid 287 will draw plunger 292 downwardly and release control finger 289 from shoulder 291 thus permitting the one-revolution clutch to rotate shaft 275 in the direction of the arrow in FIG. 39. Since the energization is momentary, soon after shoulder 291 has been released, spring 294 will return the end of finger 289 into engagement with the clutch so that when the single revolution of the cam shaft 275 is completed shoulder 291 will again engage the end of finger 289 and stop further rotation.

The necessary simultaneous release of the stop rod 288 from lug 286 is accomplished by the following operative connection of this rod with finger 289. A link 296 is pivoted to a clevis 297 which is adjustably mounted on the lower end of rod 288. The lower end of link 296 is pivoted to the top of triangular lever 298 which consists of two parallel triangular plates connected together along their bottom edges and mounted on pivot 290 on opposite sides of finger 289. At its lower right end a projection 299 on triangular lever 298 is connected to a tension coil spring 300, the upper end of which is connected to finger 289. A pin 301 extends between the two plates forming triangular lever 298 and is engaged by the bottom of finger 289.

Thus, when solenoid plunger 292 is pulled downwardly to release control finger 289 it simultaneously pulls rod 288 downwardly releasing its upper end from one of the slotted lugs 286. The solenoid is deenergized almost instantly and finger 289 will be in substantially the position shown in FIG. 39 at the time the next slotted lug 286 approaches the upper end of rod 288. The yieldable connection of this rod to control finger 289 through spring 300 permits the depression of the rod by the cam surface of the slotted lug without interfering with the position of control finger 289.

Returning to the operation of the transport member or carrier comb 263 in separating successive groups of swabs as they are advanced by the accumulator wheel 17 and placing them in a carton or box 19 at packing position 261, the transport member itself consists of a rectangular plate from which the teeth 264 project downwardly. These teeth are arranged as shown in FIGS. 49 and 50 in three semi-circular parallel rows, one row on each side and one row at the center. The individual teeth of the center row are slightly out of line with the corresponding teeth in the two side rows so that the sticks 4 of the swabs are bent slightly in order to give the teeth a secure grip on the swab sticks.

Carrier comb 263 is supported by means of two parallel rods 302 and 303, the latter having a series of rack teeth on its inner surface. These rods are received in parallel bores in a carrier comb support 304 which is a rectangular plate some three-quarters of an inch or more in thickness having a circular aperture in its upper portion in which a ball-bearing 305 is mounted which serves to support the carrier support on shaft 252. In its lower portion there is a rectangular opening 306 and extending lengthwise of this opening and in parallel relation of the rods 302 and 303 are two short rods 307 and 308, the latter having rack teeth in its outer surface. Rods 307 and 308 are fixed at their opposite ends to the support 304.

Mounted to slide on these two fixed rods there is a traveler 309 which is a short rectangular bar having a cross-pin 310 fixed at its right end (FIGS. 43–47). On the outer end of pin 310 there is a cam follower roller 311 and centrally on this pin there is a pinion 312 whose teeth mesh constantly in the rack teeth of both the stationary rod 308 and movable rod 303. Roller 311 cooperates with a cam plate 313 having a cam track 314 therein to receive the roller. Referring to FIG. 47 cam plate 313 is also mounted for oscillation on shaft 252 and, therefore, oscillates concentrically with carrier comb support 304. For this purpose cam plate 313 has a ball-bearing 315 at its upper end which is mounted within a recess in the side of support 304, both this ball-bearing and bearing 305 for support 304 being mounted on the inner portion of hub 251 of accumulator wheel 17.

The carrier comb 263 is projected outwardly from the position of FIG. 43 by relative rocking movement of cam plate 313 with respect to comb support 304. Cam track 314 causes roller 311 to move outwardly as will be seen by comparing FIGURES 43 and 44. The purpose of the pinion 312 and the rack teeth on rods 308 and 303 is to increase the travel of carrier comb 263 under the action of the cam.

Swinging movement of carrier comb 263 from the position of FIG. 44 to vertical position, as shown in FIG. 47, and vice versa, is produced by cam 277 (FIG. 52) previously mentioned which is one of the three cams on cam shaft 275. This cam has a follower mounted on the side of a lever 316 which is pivoted on a cross-shaft 317 supported by frame 1 below rotating table 262 (FIG. 40). At its outer end this lever is connected by means of an adjustable link 318 with the lower rear corner of carrier comb support 304.

The limits of the swinging movement of the carrier comb support 304 are determined by two fixed stop pins 319 and 320 (FIGS. 44 and 45). The upper limit of the swing is fixed by stop pin 319 which projects from a bar 321 (FIG. 40) which is secured to the outer side of said plate 63a. Stop pin 320 fixes the lower limit, and is the horizontal portion of an L-shaped formation 322 (FIG. 47) which projects downwardly from a collar fixed to the inner end of a rod 323. This rod is secured in an aperture in one of a pair of bracket members 324 and 324a which are mounted on the outer sides of the respective plates 63 and 63a. For engaging these stop pins an L-shaped bracket 325 is mounted on the right side edge at the bottom of carrier comb support 304 (FIG. 46). The right side of the lower end of this bracket engages stop pin 320, while an extension 326 projects from the lower end of this bracket and engages stop pin 319 (FIG. 44).

Cam plate 313 which produces the radial shifting of carrier comb 263 is actuated by cam 276 on cam shaft 275. Its cam track is engaged by a roller on the side of a lever 327 (FIG. 50) pivoted on cross shaft 317 and connected at its opposite end by an adjustable link 329 with the upper right-hand corner of the cam plate.

In the operation of the packing mechanism the cycle commences with carrier comb 263 and its related parts in the upper angular position shown in FIG. 43 with the extension 326 on L-shaped bracket 325 engaging stop pin 319. With all of the various parts in the positions shown in this figure, cam shaft 275 is stationary and held against rotation by the control finger 289 of one revolution clutch 274, the input side of which is in continuous rotation. The input side is being driven through slip drive 271 on shaft 269, this slip drive operating as an overload safety device which allows all of the parts of the packing mechanism to remain stationary should a jam occur in the mechanism.

The energization of solenoid 287 is controlled by a microswitch 330 (FIG. 39) which by suitable wiring (not shown) closes and opens the electrical operating circuit of the solenoid 287. Microswitch 330 is actuated by a lever 331 having a lateral projection at its lower end which extends into the path of the tips of the swabs carried by accumulator wheel 17 (FIG. 38).

As the accumulator wheel 17 is rotated step-by-step by the insertion of successive swabs at infeed position 16, the tip of the foremost swab on the wheel engages the end of lever 331 and closes microswitch 330 thereby energizing solenoid 287. This initiates the rotation of cam shaft 275 through a single revolution which carries the packing mechanism through a complete cycle of operation.

During the first part of the rotation of cam shaft 275, cam 276 causes cam plate 313 (FIG. 51) to swing in a clockwise direction as indicated by the arrows in this figure and in FIG. 44. During this period cam 277 maintains the carrier comb support 304 in the position of FIG. 44 and the relative clockwise movement of cam plate 313 causes the carrier comb 263 to be shifted or projected radially outward to the position shown in FIG. 44. In the final part of this outward movement a pair of arcuate pusher strips 332 (FIGS. 44 and 47) mounted on the sides of comb 263 engage the sides of the sticks 4 of the swabs and push them out radially beyond the grooves 18 of accumulator 17.

As the lowermost swab commences to move outwardly it leaves the microswitch lever 331 thus opening the switch and deenergizing solenoid 287. As this occurs during the first few degrees of rotation of cam shaft 275, the control finger 289 of the one revolution clutch 274 returns upwardly under the action of spring 294 ready to stop the clutch at the end of its complete revolution.

The next movement of the carrier comb 263 is a swinging movement downwardly to vertical position as shown in FIG. 45 where its movement is arrested by stop pin 320. This swinging movement is occasioned by the swinging of carrier comb support 304 by cam 277, and during such movement cam plate 313 continues its movement by cam 276 in such manner as to maintain the carrier comb 263 in its outward position.

When the vertical position of FIG. 45 is reached, cam 277 maintains the carrier support 304 in vertical position for a time and cam 276 continues the clockwise movement of cam plate 313. As the roller 310 which follows the cam track 314 of this plate passes beyond point 333 of this cam track (FIG. 46), the carrier comb 263 and its supporting rods 302 and 303 are permitted to descend vertically by gravity and this carries the teeth 264 of the carrier comb into the box or carton 19 at the loading position 261. At this point two stripper plates 334 and 334a (FIG. 47) descend under the action of cam 278, about to be described, and first line up the arcuate row of swabs along the arcuate plate 332 and then strip these swabs from the ends of the carrier teeth 264 to form the layer in box 19.

In FIG. 46 two previous layers 335 and 336 have already been inserted. As each layer is inserted the operator places a separator 337 in the form of a piece of cardboard or the like on top of the deposited layer. Two such separators have been placed in the box shown in FIG. 46 and the third layer of swabs whose insertion has just been described, has been placed on top of the second separator. The widening of cam track 314 at the right of point 333 permits the required variation in the depositing movement of carrier comb 263 to place the layer of swabs at any level.

Cam 278 retains the stripper plates at their lowermost position indicated by dot-and-dash outline in FIG. 46 while cam plate 313 reverses its motion and is quickly returned to its initial position, as shown in FIG. 50, thereby raising and returning the carrier comb 263 to its uppermost position. Thereupon cam 277 swings carrier support 304 in the opposite direction and returns it to the position shown in FIG. 44.

A new cycle is now ready to commence and it will be understood that during the packing cycle, just described, the feeding of swabs at the infeed position 16 has continued and another group of swabs (to form a succeeding layer) has advanced opposite the carrier comb 263 in FIG. 43, and the foremost of these swabs is about to actuate the microswitch 330 (FIG. 39) to commence the succeeding packing cycle.

The two stripper plates 334 and 334a (FIG. 47) are independent of one another, although actuated by the same cam, namely, cam 278. Thus stripper plate 334 is mounted on the lower ends of a pair of vertical supporting rods 338 which are arranged to slide in vertical guideways in a supporting block 339 which is mounted on the inside of vertical frame plate 63. Stripper plate 334a on the opposite side is similarly mounted on parts indicated by the same reference numerals with the subscript a.

These two stripper plates are simultaneously actuated by two parallel arms 340 and 340a. The forward ends of these arms are connected to the respective stripper plates by short links 341 and 341a, while the rear ends are fixed to a cross-shaft 342 which is supported near its opposite ends by the two brackets 324 and 324a. To actuate both arms simultaneously a vertical link 343 is pivotally connected to arm 349, as shown in FIGS. 43 and 52, and the lower end of this link is pivoted to an operating lever 344 which is pivoted on cross shaft 317 and which has a roller cooperating with the cam track of cam 278.

A tension coil spring 345 urges the strippers downwardly.

In the machine described each layer comprises thirty swabs, but the number of swabs which are handled by carrier comb 263 may be varied by increasing or reducing the number of comb teeth 264. This number can be varied from about eleven swabs to about forty with the present machine, but the machine can be constructed to handle substantially any desired number of swabs.

The swab machine can be readily set up to manufacture swabs of different lengths and with different sized cotton tips. The mounting of the main parts of the apparatus on the two parallel frame plates 63 and 63a enables the spacing of the carrier wheels or discs 9 and the transfer wheels or discs 14 and their related parts, and also the stripper plates of the box loading mechanism and various parts of the machine to be shifted laterally with respect to one another merely by changing the spacing of the supporting plates 63 and 63a. With a change of the swab length, the hopper 2 is replaced by a hopper which will accommodate sticks of the desired length. The endless chains 6, 6a which carry these sticks through the adhesive-applying position and to the carrier wheels 9 will handle sticks of a considerable variation in length without change. At the stick twirling position the approach of the transfer carriers 93 to the ends of sticks of differing lengths can be readily accommodated through the adjustment of their operating levers 173. Also, as previously mentioned, the cotton handling equipment or tuft-forming mechanism supported by the casing 85 on both sides of the machine can be adjusted to measure and separate cotton tufts of different lengths or amounts of cotton.

We claim:

1. In a machine for making swabs, mechanism for grasping and twirling a stick so that tufts of cotton applied to the ends thereof by reciprocating devices moving in line with said stick will form swab tips thereover, said mechanism including a pair of friction rollers adapted to sandwich the stick between them, a stick carrier comprising a pair of spaced discs arranged to rotate on the same axis as one of said rollers and with a step-by-step motion, said discs having marginal radial slots to accommodate the stick therein, a supply of sticks, mechanism for transferring the sticks from the stick supply to the carrier discs and depositing them one at a time in the slots thereof, and wherein each of the reciprocating devices is characterized by having an elongated member mounted for sliding movement and provided with a pair of axially extending jaws pivoted at one end and spring-biased toward closed position for grasping a tuft of cotton and applying it to one end of the twirling stick, and further characterized by having a spring-actuated mechanism for causing said jaws to close and including a trigger device for controlling said mechanism.

2. A machine for making swabs as set forth in claim 1 wherein the jaws are made to open during the stressing of the spring of said spring-actuated mechanism.

3. A machine for making swabs as set forth in claim 2 wherein the stressing of said spring is brought about by movement of the elongated member toward tuft-applying position.

4. A machne for making swabs at set forth in claim 2 wherein the elongated member is tubular in form and characterized by having a pair of sleeve members slidable externally thereof with a coil spring arranged to bias them away from each other and wherein the trigger device is pivoted on one sleeve and has a latch portion engaging the other sleeve to hold the spring in stressed condition, and a connection between one of said sleeves and the pivoted jaws so that when said latch member is tripped, the relative motion between said sleeves causes the closing of said jaws.

5. A machine for making swabs as set forth in claim 4 wherein a stop device is provided for engaging the first-mentioned of said pair of sleeves to cause it to slide on the tubular member during movement thereof so as to compress said spring and cause said latch member to engage the second-mentioned sleeve and hold the spring in stressed condition.

6. A machine for making swabs as set forth in claim 1 further characterized by having feeding jaws for carrying successive tufts to the tuft-applying jaws, and wherein the trigger device is actuated by means associated with said feeding jaws so as to cause the closing of said jaws after a tuft has been inserted between them by the feeding jaws.

7. In a machine for making swabs, mechanism for grasping and twirling a stick at a twirling position so that tufts of cottom applied to the ends thereof by reciprocating devices moving in line with said stick will form swab tips thereover, said mechanism including a pair of rotating friction rollers adapted to sandwich the stick between them at the twirling position, a stick carrier comprising a pair of spaced discs having marginal radial slots to accommodate the stick therein and carry it to the twirling position between said rollers, a transfer wheel comprising a pair of spaced discs having marginal radial slots therein, said transfer wheel receiving the successive swabs from said carrier and transporting them to a point adjacent a packing mechanism, a step-drive mechanism for intermittently turning said carrier and said transfer wheel each by a predetermined angular amount, arcuate rail members supported radially inwardly of the periphery of said transfer wheel having aligned apertures therein at their uppermost point, said rails supporting the swabs by engaging the cotton tips thereof beyond the ends of the swab sticks so that should a tip be missing the corresponding end of the stick will fall inwardly toward the bottom of the slot in the transfer wheel as the swab passes said apertures in the rails, and means for ejecting such stick as the transfer wheel continues to be advanced by said step-drive mechanism.

8. A machine for making swabs as set forth in claim 7 characterized by having a swab detecting device including a member which spans the distance between two adjacent slots of the said transfer wheel so that if two successive swab sticks are below the elevation of said arcuate rails, said swab detecting device will be shifted radially inwardly, and means actuated by such movement thereof for stopping the operation of the machine.

9. A machine for making swabs as set forth in claim 7 in which packing mechanism is arranged adjacent said transfer wheel for packing the swabs in boxes, a finger being provided to engage the successive swab sticks at each step advance of said wheel to a discharge point near said packing mechanism, and characterized by having means for actuating said finger in timed relation to said step drive mechanism so as to shift the successive swabs into the packing mechanism.

10. A machine for making swabs as set forth in claim 9 wherein the packing mechanism includes an accumulator wheel having notches in the periphery thereof to receive the stick portions of individual swabs, and characterized by having mechanism for imparting to said finger a horizontal motion followed by an upward motion, the horizontal motion causing the shifting of a swab from the transfer wheel to the accumulator wheel and the upward motion serving to apply a force against the swab stick for advancing the accumulator wheel one step to bring an empty notch into position to receive the next successive swab stick.

11. In a machine for making swabs, mechanism for successively grasping and twirling individual sticks and applying tufts of cotton to the ends thereof to form swab tips thereover at a twirling position, and having mechanism for packing the swabs in boxes including an accumulator wheel having equally spaced notches in its periphery for receiving the stick portions of individual swabs, transfer mechanism for moving the swabs from the twirling position to the notches of said accumulator wheel, said transfer mechanism being characterized by having a finger to engage successive swab sticks to shift them horizontally into the respective notches of the accumulator wheel, and further characterized by having mechanism for imparting to said finger a horizontal motion followed by an upward motion the horizontal motion causing the shifting of an individual swab into a notch of the accumulator wheel, and the upward motion serving to advance the accumulator wheel one step by applying a force against said swab stick, so that the movement of the accumulator wheel is dependent upon the presence of a swab on said finger.

12. In a machine for making swabs, mechanism for successively grasping and twirling individual sticks and applying tufts of cotton to the ends thereof to form swab tips thereover at a twirling position, and characterized by having mechanism for depositing the swabs in boxes in layers, said mechanism including an accumulator wheel having notches in the periphery for receiving the individual swabs, transfer mechanism for moving the swabs from the twirling position to the notches of said accumulator wheel, a stationary guard for retaining the swabs in said notches throughout a substantial portion of the circumference of said wheel, and a transport member for removing a group of swabs from the accumulator wheel and depositing them in a box, said transport member being arranged to swing about the axis of said accumulator wheel from a loading position opposite said stationary guard and at one side of the vertical to a depositing position in line with the vertical.

13. A machine for making swabs as set forth in claim 12 wherein the stationary guard is provided with an outwardly yieldable extension disposed at one side of the vertical, and the transport member is arranged to move radially outwardly to remove the group of swabs from the accumulator wheel teeth prior to swinging to the depositing position.

14. A machine for making swabs as set forth in claim 13 wherein the transport member is provided with spaced radially extending teeth for engaging and holding the sticks of individual swabs.

15. A machine for making swabs as set forth in claim 14 wherein arcuate continuous pusher strips are arranged along each side of the teeth of the transport member to engage the sticks of the swabs and push them outwardly away from the teeth of the accumulator wheel.

16. A machine for making swabs as set forth in claim 15 wherein a stripping device is arranged to move downwardly while the transport member is in the depositing position and force the swabs free from the transport teeth to form a layer in the box.

17. A machine for making swabs as set forth in claim 16 further characterized by having a cam shaft with cams thereon to control respectively the swinging movement of the transport member, the radial movement of said member and the movement of the stripper device, said cams being so arranged that a single revolution of the cam shaft operates said device through a complete cycle, a continuously rotating shaft and a one-revolution clutch interconnecting said shaft and said cam shaft, a solenoid for controlling said clutch, and a switch actuated by the foremost swab in the accumulator wheel to close said switch and initiate said cyclic operation of the packing mechanism.

18. A machine for making swabs as set forth in claim 17 wherein the boxes to receive the swabs are supported in equally spaced position on a rotary table, means for imparting rotation to said table, and means for controlling said rotation in a step-by-step manner, said means being operated by the solenoid controlling the one revolution clutch so that a step movement is imparted to said table at each cycle of said packing operation.

19. In a machine for making swabs, mechanism for measuring and separating uniform lengths from a cotton strip to form tufts for application to the swab sticks, said mechanism being characterized by having a pair of stationary jaws, a pair of movable jaws disposed parallel thereto on one side, a funnel member disposed on the opposite side of said stationary jaws through which said strip extends to and between said jaws, means for closing both pairs of jaws simultaneously to grasp the portion of said cotton strip extending between said jaws, means for advancing the movable jaws and for retracting the funnel while said jaws are closed, the advance of the movable jaws tearing apart the cotton strip which extends between said closed jaws to form a tuft and the funnel during said retractive movement sliding along the cotton strip to measure the length of the next successive tuft, means for opening said pairs of jaws, and means for retracting said movable jaws to their original position and for simultaneously advancing the funnel to move the cotton strip forward and project the measured portion thereof between said pairs of jaws.

20. A machine for making swabs as set forth in claim 19 wherein said pairs of stationary and movable jaws are mounted each pair in a supporting head which is held against rotation, the head for the movable jaws being slidable in a direction perpendicular to the planes of these jaws, and characterized by having parallel shafts extending from said heads for opening and closing the jaws by rocking movement, a slidable rod carrying said funnel member being supported for sliding movement parallel to said rock shafts.

21. A machine for making swabs as set forth in claim 20 wherein a cam shaft is arranged for rotation parallel with said rock shafts, said cam shaft having a cam member thereon with connections to said funnel rod and the rock shaft for the movable jaws to slide them simultaneously in opposite directions.

22. In a machine for making swabs as set forth in claim 21 wherein connections are also arranged between said cam member and the rock shafts for the stationary and movable jaws for causing such shafts to oscillate simultaneously for opening and closing said jaws.

23. A machine for making swabs as set forth in claim 22 wherein the oscillating movement of said stationary and movable shafts is produced by a gear arranged to turn loosely on the cam shaft, the teeth whereof mesh with the teeth of pinion members, one of said members being fixed to one of said rock shafts, and the other of said members being connected to the other rock shaft through a reversing pinion, and a lever for imparting rocking movement to said gear, said lever having a follower engaging a cam slot in the face of said cam member whereby oscillating movement is imparted to said lever, to said gear and to said rock shafts.

24. A machine for making swabs as set forth in claim 20 wherein for opening and closing said jaws by the actuation of said rock shaft the jaws are provided with shanks extending transversely to the actuating rock shaft, each shank having a crosswise slot in the side thereof, said rock shaft having an enlargement at the end thereof, and a pair of pins mounted in apertures in the face of said enlargement and disposed on opposite sides of the axis of said shaft, said pins projecting into said respective slots so that the rocking of said shaft causes the jaws to open and close.

25. A machine for making swabs as set forth in claim 24 wherein the shanks of said jaws slide in contact with one another and the line of contact between them lies in a plane which is perpendicular to the axis of the actuating rock shaft so that the opening and closing movements of both jaws are equal.

26. A machine for making swabs comprising mechanism for grasping and twirling a stick including a pair of constantly rotating friction rollers arranged to sandwich the stick between them, a stick carrier comprising a pair of spaced discs having arcuately spaced pairs of aligned marginal slots so as to support a stick in each pair of slots, said discs being arranged to rotate with a step-by-step motion on a common axis with one of the friction rollers to carry the sticks successively to twirling position between the rollers, and means for applying a tuft of cotton to one end of the twirling stick, characterized by having means for moving the tuft-applying means in a continuous axial movement with respect to the twirling stick between a tuft-receiving position and a tuft-applying position.

27. A machine for making swabs according to claim 26 characterized by an endless conveyor having pairs of spaced fork members each pair carrying a stick from a stick supply to the stick carrier and also characterized by having a reservoir for adhesive beneath the conveyor with a pair of rollers to rotate with the lower portions thereof dipping into the adhesive and the upper surfaces engaging the outer end portions of the respective sticks as they are carried along by the fork members.

28. A machine for making swabs according to claim 27 characterized by having a friction surface mounted in stationary position to engage the central portion of each stick as it is carried by the conveyor over the adhesive rollers so as to cause it to rotate while the end portions of the stick are coated with adhesive by said rollers.

29. A machine for making swabs according to claim 27 wherein a reciprocating pusher is mounted for horizontal movement to transfer each stick from the conveyor to a pair of slots in the spaced discs as each pair of fork members on the conveyor arrives at such transfer position.

30. A machine for making swabs according to claim 26 which is further characterized by having a tip-shaping device and means for moving this device laterally against the side of the tuft of cotton after it has been applied to one end of the stick and while the stick is being twirled by the rotating friction rollers.

31. A machine for making swabs according to claim 30 wherein the tip-shaping device comprises a member having a tip shaping recess formed therein, a moisture retaining chamber connected with said recess through a lengthwise slot, and water retaining material in the chamber and exposed through said slot to engage the cotton tip and aid in forming the same, means being provided for supplying moisture to the chamber.

32. A machine for making swabs according to claim 26 wherein the tuft-applying means is a reciprocating device provided with a pair of jaws for holding a cotton tuft, means being provided for opening these jaws at the tuft-applying position and thereafter withdrawing and closing them, and further characterized by having means for feeding successive tufts of cotton to such jaws while the jaws are withdrawn from such position and while the jaws are still open.

33. A machine for making swabs as set forth in claim 31 wherein the water-retaining material consists of a sponge-like member, and characterized by having means within the chamber for resiliently urging the sponge-like member into contact with the cotton tip through the slot.

34. A machine for making swabs as set forth in claim 32 further characterized by having a pair of feeding jaws arranged to reciprocate at right angles to the path of movement of the tuft-applying jaws to the twirling stick for feeding successive tufts of cotton to the tuft-applying jaws.

35. A machine as set forth in claim 34 further characterized by having a thin blade member moved into position between the tuft-applying jaws while said jaws are in open position so that when these jaws are actuated to closed position the tuft of cotton will be folded around one edge of the blade member thereby to form a crease in the tuft, the end of the twirling stick being received within such crease.

36. A machine for making swabs as set forth in claim 35 wherein a thin blade member is mounted so as to project at right angles from each of the feeding jaws the inner edges of said blade members lying adjacent the opposite surfaces of the tuft when the feeding jaws are closed, and characterized by having both of these blade members projected between the tuft applying jaws so that when these jaws are closed the tuft will be folded about one of the blade members.

References Cited in the file of this patent
UNITED STATES PATENTS

| | | |
|---|---|---|
| 1,721,815 | Gerstenzang | July 23, 1929 |
| 1,921,604 | Bunnell et al. | Aug. 8, 1933 |
| 2,576,068 | Ganz | Nov. 20, 1951 |
| 2,754,549 | Torrent | July 17, 1956 |